US007701656B2

(12) United States Patent
Schultz et al.

(10) Patent No.: US 7,701,656 B2
(45) Date of Patent: *Apr. 20, 2010

(54) METHOD AND APPARATUS FOR PERMANENT MAGNET ERASURE OF MAGNETIC STORAGE MEDIA

(75) Inventors: Robert A. Schultz, Lincoln, NE (US); Leroy D. Thiel, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/457,675

(22) Filed: Jul. 14, 2006

(65) Prior Publication Data

US 2008/0013244 A1    Jan. 17, 2008

(51) Int. Cl.
*G11B 5/03* (2006.01)

(52) U.S. Cl. .................. 360/66; 360/60; 361/149; 361/152

(58) Field of Classification Search .................. None
See application file for complete search history.

(56) References Cited

U.S. PATENT DOCUMENTS

| 2,481,392 | A | 9/1949 | Camras |
| 2,766,328 | A | 10/1956 | Handschin et al. |
| 2,962,560 | A | 11/1960 | Folse |
| 3,023,280 | A | 2/1962 | Tronslin et al. |
| 3,078,396 | A | 2/1963 | Englested |
| 3,143,689 | A | 8/1964 | Hall |
| 3,329,872 | A | 7/1967 | Amos |
| 3,588,623 | A | 6/1971 | Camras |
| 3,711,750 | A | 1/1973 | Huffman et al. |
| 3,872,347 | A | 3/1975 | Matsushima et al. |
| 3,879,663 | A | 4/1975 | Stark, Jr. |
| 3,879,754 | A | 4/1975 | Ballinger |
| 3,895,270 | A | 7/1975 | Maddox |
| 3,938,011 | A | 2/1976 | Littwin |
| 4,136,373 | A | 1/1979 | Amos |
| 4,146,956 | A | 4/1979 | Fujiwara |

(Continued)

FOREIGN PATENT DOCUMENTS

GB    1347531    2/1974

(Continued)

OTHER PUBLICATIONS

"Design Considerations for a 1 Angstrom SASE Undulator", P. Elleaume, J. Chavanne, B. Faatz.

(Continued)

*Primary Examiner*—Jason C Olson
(74) *Attorney, Agent, or Firm*—Fitch, Even, Tabin & Flannery

(57) ABSTRACT

A permanent magnet degausser includes at least one magnetic field generator comprising magnetic elements arranged near a media conveyance path and a conveyor for transporting magnetic media through a magnetic media conveyance path. A passive belt or protector plate may be provided to assist the passage of the magnetic media through the applied magnetic field. The conveyor may be a continuous motion conveyor belt including cleats for holding the magnetic media or a reciprocal media conveyor including magnetic storage media bin. The magnetic field generator may include permanent magnets of varying intrinsic coercivities and/or remanences.

15 Claims, 12 Drawing Sheets

U.S. PATENT DOCUMENTS

| | | | |
|---|---|---|---|
| 4,157,581 A | 6/1979 | Keiichi et al. | |
| 4,180,835 A | 12/1979 | Okumura et al. | |
| 4,187,521 A | 2/1980 | Rotter et al. | |
| 4,346,425 A | 8/1982 | Gray | |
| 4,346,426 A | 8/1982 | Baumann et al. | |
| 4,378,581 A | 3/1983 | Kuno et al. | |
| 4,423,460 A | 12/1983 | Jackson et al. | |
| 4,462,055 A | 7/1984 | Jackson et al. | |
| 4,462,059 A | 7/1984 | Yamagami et al. | |
| 4,467,389 A | 8/1984 | Knipp | |
| 4,471,403 A | 9/1984 | Dress, Jr. et al. | |
| 4,551,782 A | 11/1985 | Seely et al. | |
| 4,617,603 A | 10/1986 | Johnson et al. | |
| 4,639,821 A * | 1/1987 | Littwin et al. | 361/151 |
| 4,730,230 A | 3/1988 | Helfrick | |
| 4,751,608 A | 6/1988 | Schultz | |
| 4,829,397 A | 5/1989 | Vernikov et al. | |
| 4,847,727 A | 7/1989 | Spaman | |
| 4,862,128 A | 8/1989 | Leupold | |
| 4,897,759 A | 1/1990 | Becker | |
| 5,132,860 A | 7/1992 | Von Stein | |
| 5,198,959 A | 3/1993 | Scholtysik et al. | |
| 5,204,801 A | 4/1993 | Becker et al. | |
| 5,270,899 A | 12/1993 | Saito | |
| 5,416,664 A | 5/1995 | Becker et al. | |
| 5,420,742 A | 5/1995 | Ketcham et al. | |
| 5,466,574 A | 11/1995 | Liberti et al. | |
| 5,666,413 A | 9/1997 | Kempf | |
| 5,721,665 A | 2/1998 | Schultz | |
| 5,723,917 A | 3/1998 | Chitayat | |
| 5,787,619 A | 8/1998 | Urushibata | |
| 5,886,609 A | 3/1999 | Stelter | |
| 5,969,933 A | 10/1999 | Schultz et al. | |
| 6,316,849 B1 | 11/2001 | Konkola et al. | |
| 6,570,727 B1 | 5/2003 | Tamura et al. | |
| 6,594,099 B2 | 7/2003 | Serizawa | |
| 6,664,880 B2 | 12/2003 | Post | |
| 6,714,398 B2 | 3/2004 | Schultz et al. | |
| 6,731,491 B2 | 5/2004 | Schultz | |
| 7,027,249 B2 | 4/2006 | Hasegawa et al. | |
| 2002/0021521 A1 | 2/2002 | Kitahori et al. | |
| 2003/0021652 A1 | 1/2003 | Uno et al. | |
| 2004/0051989 A1 | 3/2004 | Hasegawa et al. | |
| 2006/0018075 A1 | 1/2006 | Schultz | |
| 2008/0013245 A1 * | 1/2008 | Schultz et al. | 361/149 |
| 2008/0180203 A1 | 7/2008 | Schultz | |

FOREIGN PATENT DOCUMENTS

| | | |
|---|---|---|
| JP | 60-129909 | 7/1985 |

OTHER PUBLICATIONS

"Issues with Permanent Magnets", M. Kumada, Y. Iwashita, E.A. Anotkin.

Product Brochure, "Sanix Bulk Tape Eraser 3300 Series", 5 pages, undated.

Product Brochure, Data Security, Inc., "HD-3000" Degausser, May 1997.

Product Brochure, Data Security, Inc., "Type II-A™" Bulk Degausser, May 1997.

Product Brochure, Data Security, Inc., "Type III" Bulk Degausser, May 1997.

Product Brochure, Data Security, Inc., "HD-2000" Degausser, May 1997.

"Operator Manual 5661C Degausser", Rimage P/N 889057-003, Revision 03, Sep. 21, 1990, Rimage Corporation.

"Degaussing Electromagnetic Articles by the Phase Control of AC Power", J. Reed, Western Electric Company, inc., Technical Digest No. 33, pp. 45-46, Jan. 1974.

* cited by examiner

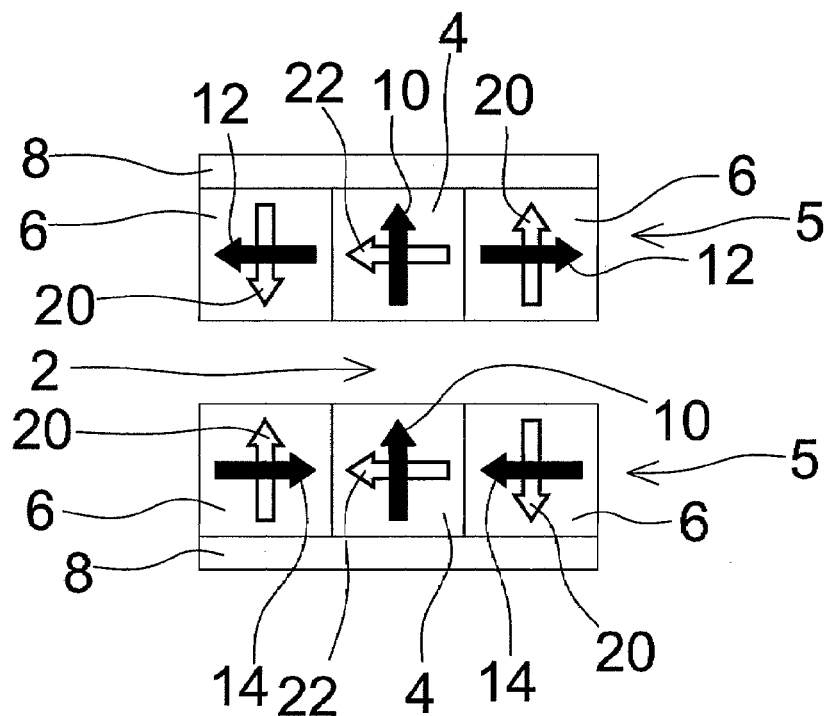
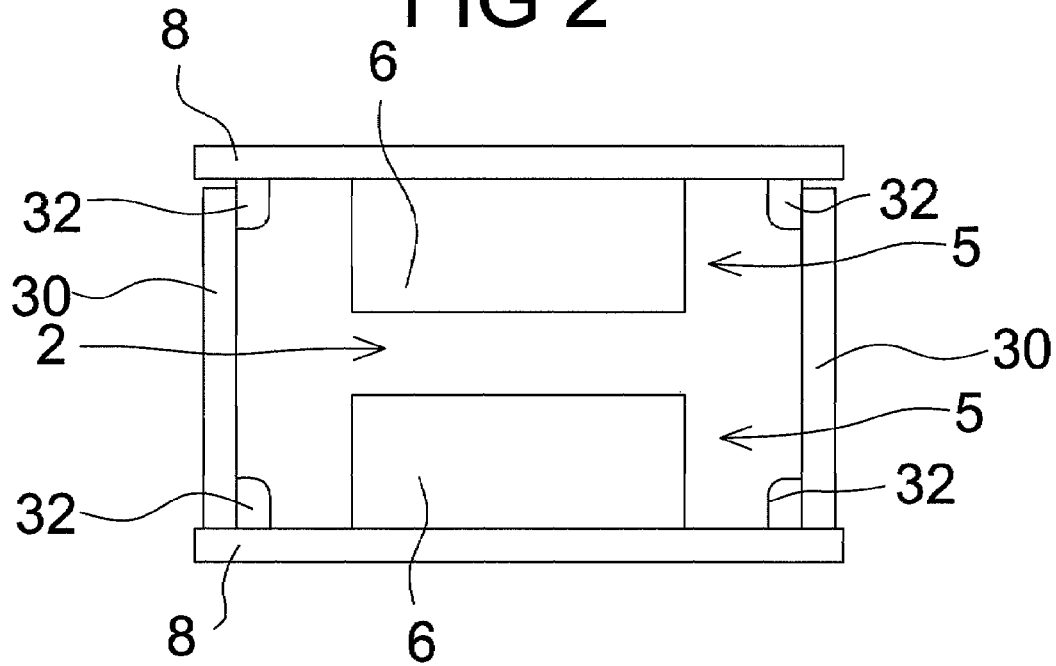

METHOD AND APPARATUS FOR PERMANENT MAGNET ERASURE OF MAGNETIC STORAGE MEDIA

TECHNICAL FIELD

This invention relates to magnetic storage media erasure and the mechanisms that may be applied to enhance such erasure.

BACKGROUND

Prior degaussers typically require manual manipulation of magnetic storage media, such as magnetic storage tape, hard disk drives, and the like, by a user in between passes of the media through a magnetic field to achieve uniform multidirectional magnetic field exposure for optimum erasure performance. The raw magnetic strength applied to certain magnetic storage media such as hard disk drives can overcome the lack of multidirectional exposure in the plane of the disk along the directions of the circular tracks recorded on the disk. Meanwhile, hard disk drive technology has advanced to the era of perpendicular recording on the disk with increasing coercivity ratings requiring a higher applied magnetic field strength for erasure.

Perpendicular recording and the possibility of further coercivity increases in magnetic disk drives are creating a demand for perpendicular magnetic field strength and an approximately equivalent horizontal magnetic field strength to be applied in degaussers. Typically, the disks are only partially constrained in the drive by the frictional force of parked heads, and strong erase fields acting on the spindle rotors might overcome that force, leading to less than certain demagnetization results.

Certain prior attempts to erase hard disk drives included apparatuses that apply a degaussing magnetic field almost directly to the disk while rotating the disk within the drive. The relationship, however, between external features of various hard disk drive brands and models and their internal components like spindle motors and head motors are not universally obvious. Therefore, in general application it is desirable to treat the entire volume of each hard disk drive.

BRIEF DESCRIPTION OF THE DRAWINGS

The above needs are at least partially met through provision of the method and apparatus for permanent magnet erasure of magnetic storage media described in the following detailed description, particularly when studied in conjunction with the drawings, wherein:

FIG. 1 is an elevational view perpendicular to a magnetic media path through one embodiment of a Halbach-like array permanent magnet degausser in accordance with various embodiments;

FIG. 2 is an elevational view parallel to a magnetic media path through one embodiment of a permanent magnet degausser in accordance with various embodiments;

Figure 3:
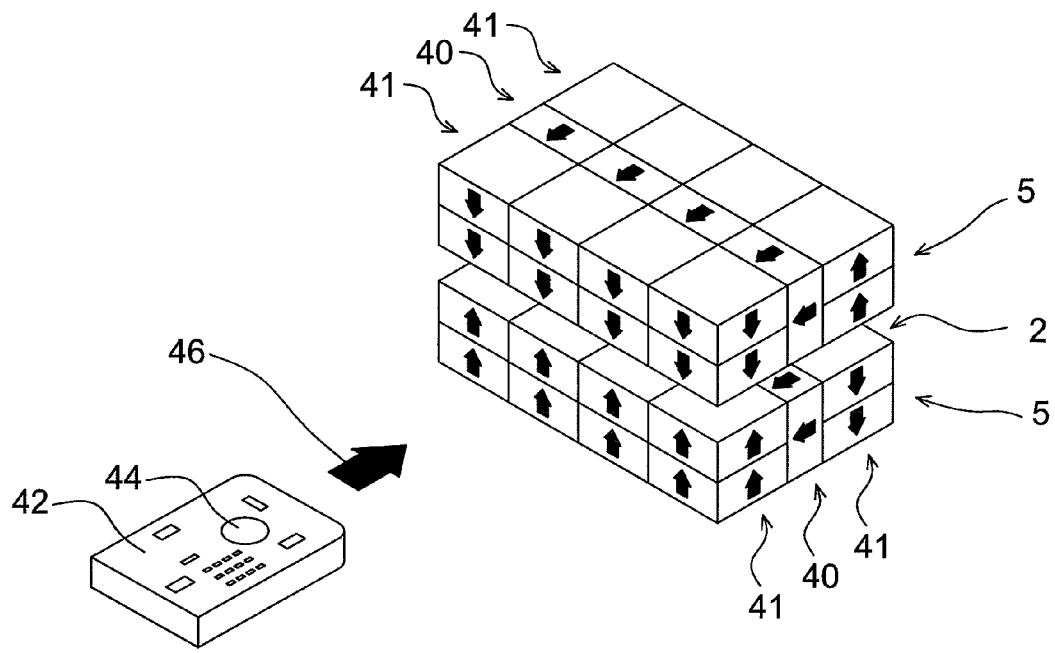
FIG. 3 is a perspective view of a permanent magnet degausser in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Generally speaking, pursuant to these various embodiments, a permanent magnet degausser includes at least one magnetic field generator comprising magnetic elements arranged near a media conveyance path and a conveyor for transporting magnetic media through a magnetic media conveyance path. A passive belt or protector plate may be provided to assist the passage of the magnetic media through the applied magnetic field. The conveyor may be a continuous motion conveyor belt including cleats for holding the magnetic media or a reciprocal media conveyor including magnetic storage media bin. The magnetic field generator may include permanent magnets of varying intrinsic coercivities and/or remanences.

Various embodiments of these degaussers allow for high volume and high quality demagnetization of magnetic storage media such as hard disk drives, magnetic tape, and other magnetic media devices. Additionally, when using permanent magnet magnetic field generators, the degaussers can operate without expensive and complicated electronics for generating the magnetic fields. Permanent magnet arrangements also typically allow for high field strength and uniformity in a variety of field directions to provide improved erasure of hard disk drives.

Production of the Magnetic Field

With reference to the figures, and in particular to FIG. 1, permanent magnet arrays 5, also called magnetic assemblages 5, comprising Halbach-like arrays having ¾ of one full Halbach period face each other across a gap 2. This illustrates an example of a magnetic field generator's having at least two magnetic assemblages 5 disposed on opposite sides of the magnetic media conveyance path 46 thereby defining a gap 2 for the path 46. A more thorough discussion of the application of Halbach-like arrays in the field of permanent degaussing as developed by one of the current inventors is discussed in U.S. patent application Ser. No. 10/897,882, titled "Permanent Magnet Bulk Degausser" and filed Jul. 23, 2004 ("the '882 application"), which is incorporated herein in its entirety.

As depicted in FIG. 1, Halbach arrays of classic linear form consist of touching or closely spaced permanent magnets, generally depicted as squares in cross-section, including inner permanent magnet members 4 and outer permanent magnet members 6. Ferromagnetic plates 8 can line the permanent magnet array surfaces opposite the gap 2 for structural support, to aid in assembly, for enhancement of magnetic performance, or to provide a magnetic circuit element. Cold rolled steel plate, for example, provides excellent and economical mechanical and magnetic properties for the plates 8.

The directions of magnetizations depicted by the solid arrows of FIG. 1 represent an example vertical generator, a group of permanent magnets creating a generally vertical magnetic field in the gap 2 relative to the permanent magnet arrays. This embodiment includes permanent magnet elements 4 with the same vertical magnetic field directions 10 above and below the gap 2 in cooperation with the outward horizontal magnetic field directions 12 provided by permanent magnet elements 6 above the gap 2 and inward horizontal magnetic field directions 14 provided by permanent magnet elements 6 below the gap 2. Such an arrangement generates a generally upwardly vertical magnetic field of peak strength toward the center of the gap 2.

The directions of magnetizations depicted by the outlined arrows of FIG. 1 represent an example horizontal generator, a group of permanent magnets creating a generally horizontal magnetic field in the gap 2 relative to the permanent magnet arrays. This embodiment includes permanent magnet elements or segments 6 with opposite vertical magnetic field directions 20 facing each other above and below the gap 2 in cooperation with the same horizontal magnetic field directions 22 provided by the permanent magnets 4 between them. Such an arrangement generates a generally right pointing horizontal magnetic field of peak strength toward the center of gap 2.

FIG. 2 illustrates the permanent magnet degausser of FIG. 1 showing the sides of outer permanent magnets or segments 6 and plates 8. The horizontal plates 8 may extend outward to or beyond the vertical structural members 30. The horizontal plates 8 preferably have a thickness sufficient to prevent or minimize magnetic saturation in the vertical generator, and roughly equivalent thicknesses for both plates 8 is preferable for the magnetic properties of a horizontal generator.

In a preferred embodiment, the permanent magnet degausser includes at least two plates 30 extending between the at least two magnetic assemblages 5 to surround the magnetic media 42 on four sides as it passes through the gap 2. In a preferred vertical generator embodiment, the vertical plates 30 are steel to return vertical flux between the magnetic assemblages and thick enough to prevent saturation. The vertical plates 30 need not touch both horizontal plates 8 as rod shaped gussets 32, which may or may not touch both horizontal plates 8 and vertical plates 30, complete the return path for vertical magnetic flux between the magnetic assemblages thereby forming a single efficient magnetic circuit. Loose limits can be placed on the vertical plate 30 positions without much affect on magnetic strength. Bolts placed through slotted holes in the vertical plates 30 and into the gussets 32 can provide further adjustment space against magnet element fabrication and assembly dimensional tolerances to achieve a more precise vertical gap 2 dimension. Vertical members 30 and gussets 32 also provide support against the compression force due to attraction of the vertical generator magnetic assemblages.

In a preferred horizontal generator embodiment, the vertical plates 30 are nonmagnetic, for example stainless steel, sheets formed into shallow channels attached to the nonmagnetic gussets 32, for example those machined from aluminum. Vertical plates 30 can have slotted holes for attachment to the gussets 32 and for adjustability against manufacturing tolerances. Being nonmagnetic, the vertical plate 30 positions do not affect the magnetic strength of the horizontal generator. The dimensions of the vertical plate 30 or channel can be adjusted as needed against the tension force due to the repulsion of the horizontal generator halves.

For both vertical and horizontal magnetic field generating embodiments, the vertically magnetized permanent magnet elements generally form poles about the gap 2, and horizontally magnetized permanent magnet elements generally serve to direct, reinforce, and concentrate magnetic flux density toward the center of the gap 2. This dynamic of magnetic fields is often termed a superposition of fields emanating from the variously directed permanently magnetized regions. The superposition of fields results in the magnetic field in the gap 2.

Because the superposition of fields creates the applied magnetic field, a variety of field directions and strengths may be created and used within the gap 2. The permanent magnet segments may be in the form of plates, cubes, or rods as necessary for a given embodiment. The squares or rods are preferably formed from an assembly of sub-elements such as magnet blocks or elements having a 2×2×1 aspect size magnetized in the thin dimension because of the cost savings realized in using a number of identical or similar elements to build the magnetic assemblages.

Permanent magnet element count and weight are typically compared to the resulting magnetic strength and uniformity of the degausser to provide the primary optimization criteria for a given application. The magnetic media width in the gap 2 provides a preferred parameter for a worst case strength analysis, and media width as compared to the mid gap magnetic field strength provides a suitable uniformity parameter.

Further optimization often includes positioning the magnetic assemblages as closely together as possible. Generally, the magnetic storage media is carried through the magnetic field within the gap 2 in a bin or other carrier with the smallest possible thickness while having the size and strength needed to contain the media and extract it from the magnetic field. For example, the magnetic assemblages are held apart at a gap distance just over the one inch thickness of the standard hard disk drive form factor to allow for any thickness of the bin or carriage plus, in some alternatives, the thickness of a means to protect the permanent magnet materials from the to-be-erased magnetic media traveling through the gap 2.

Even further optimization can be achieved by applying a horizontal field strong enough to erase a hard disk drive without rotation of the platters or disks contained therein. In these embodiments, the applied magnetic field need only have a uniform and sufficient magnetic strength as large as the smallest cross section of the hard disk drive. The bin or carrier would then move the drive through the magnetic field in the gap 2 in the direction of the media's longest dimension. For a typical "desk top" hard disk drive, the small cross section is just over one inch thick by four inches wide. By contrast, the longest dimension approaches six inches, which would impose a penalty on the amount of expensive and heavy permanent magnet material needed to generate a field of that size.

Figure 4:
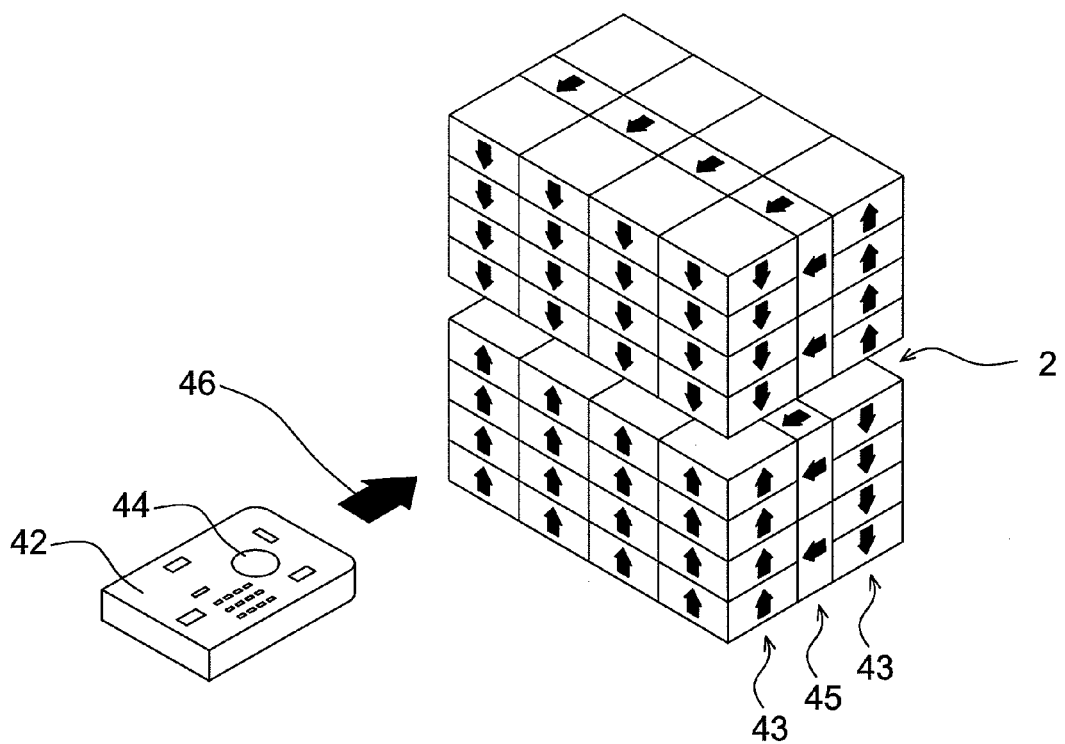
FIG. 4 is a perspective view of a permanent magnet degausser in accordance with various embodiments.

In accordance with these general parameters, various embodiments for the magnetic assemblages of permanent magnets are shown in FIGS. 3 through 7 and are discussed in the '882 application. For example, FIGS. 3 and 4 depict horizontal magnetic field generator structures built from 2×2×1 permanent magnet elements with the segment thicknesses ranging from roughly 1 inch to nearly 2 inches (50 mm). Arrows on the element sides of FIG. 3 and FIG. 4 depict the constant direction of magnetization through the element thickness. The figures omit the support structures for clarity.

Inner horizontally magnetized segments 40 of the one-layer embodiment of FIG. 3 have a non-square profile when viewed perpendicular to the magnetic media 42 path 46. In contrast, outer segments 41 have a square profile, which is commonly associated with "classic" Halbach arrays. FIG. 4 depicts a "two-layer" embodiment offering a slight strength increase even across a greater gap 2 than the "one-layer" embodiment of FIG. 3.

For example, 34 mm thick permanent magnet elements may be used in the embodiments of FIGS. 3 and 4 to erase a typical "desk top" hard disk drive 42. For the "one-layer" embodiment of FIG. 3, the gap 2 scales to about 1.2 inches and the magnetic field strength simulates to about 1.2 T. For the "two-layer" embodiment of FIG. 4, the gap 2 scales to about 1.4 inches and the magnetic field strength simulates to about 1.4 T. A typical hard disk drive 42 includes a circular projection of a spindle motor 44 through a circuit board side with various electronic components that factor into the difficulty of media transport in direction 46 through gap 2. Preferably, a horizontal generator using the elements of this example uses at least four elements creating a gap 2 width of about 10.7 inches to counter fringing effects and yield a field uniformity of about a few percent over the four inch media width.

Figure 5:
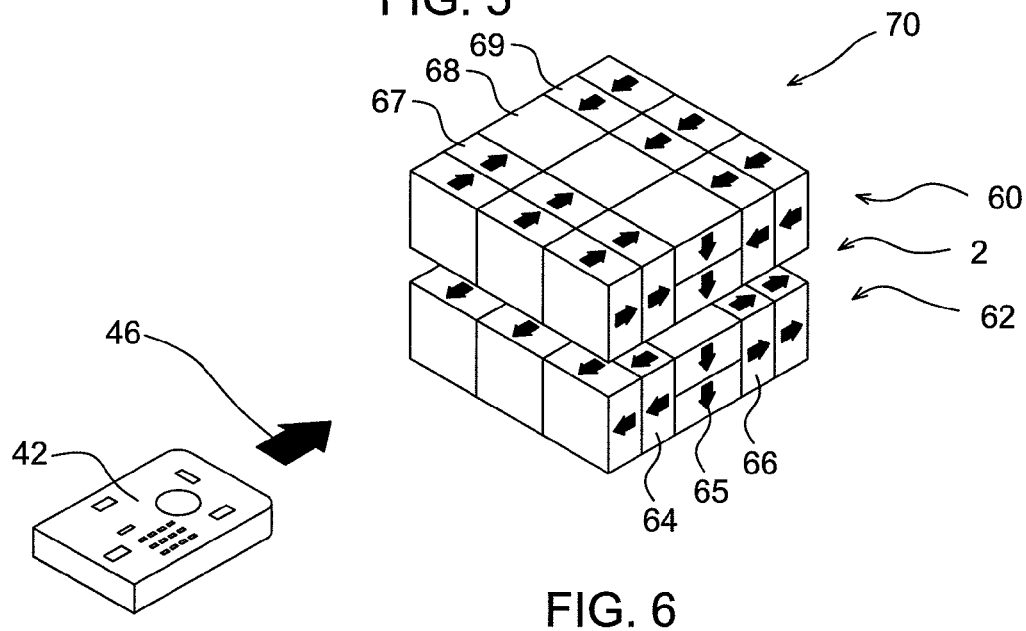
FIG. 5 is a perspective view of a permanent magnet degausser in accordance with various embodiments.

Referring to FIG. 5, an example "one-layer" assemblage vertical field generator 70 uses a larger magnetic assemblage needing only three elements of width to accomplish comparable strength and uniformity of field across the same media width as the four element wide horizontal generator of FIG. 3. Such vertical generators can be comprised of an upper assemblage 60 containing a central upper magnet segment 66 and a lower assemblage 62 containing a central lower magnet segment 65 magnetized in the same vertical direction. The horizontally magnetized lower outer segments 64 and 68 can be said to "pull" more magnetic flux out of the downward pointing magnetic pole of the middle segment 65. The horizontally magnetized upper outer segments 67 and 69 can be said to "push" more magnetic flux into the downward pointing pole of the middle segment 66. A "two-layer" three element wide vertical generator complimentary to FIG. 4 provides similar degrees of strength versus uniformity and material savings advantages as seen with the previous example.

Figure 6:
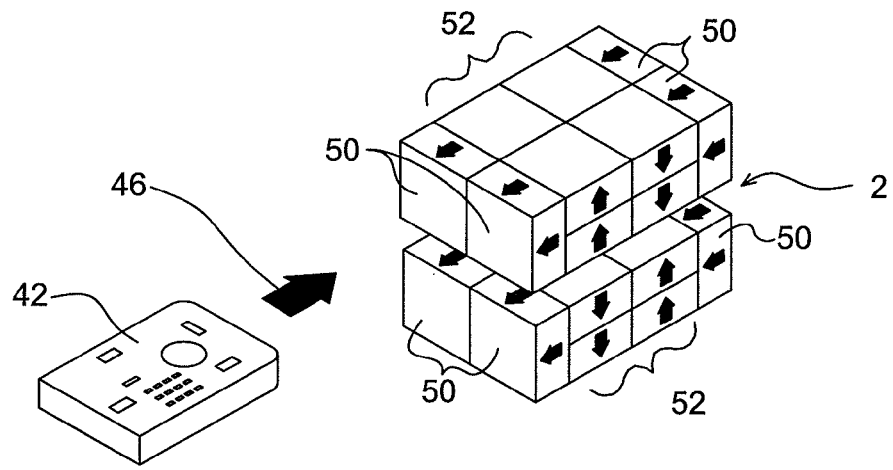
FIG. 6 is a perspective view of a permanent magnet degausser in accordance with various embodiments.
Figure 7:
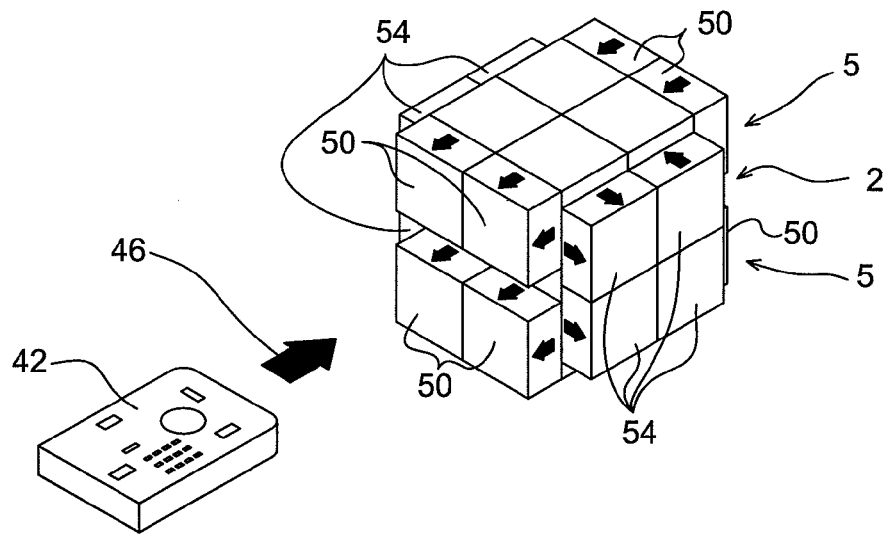
FIG. 7 is a perspective view of the permanent magnet degausser of FIG. 6 with additional magnetic elements surrounding the magnetic media conveyance path in accordance with various embodiments.

With reference to FIGS. 6 and 7, the magnetic field generators need not be limited to Halbach-like permanent magnet arrangements. FIG. 6 illustrates in general the addition of eight permanent magnet elements 50 to a more conventional magnetic circuit 52. This example illustrates a Halbach-style orientation of the added "helper" magnet elements 50 that effectively push or pull flux into or out the vertically magnetized segments of the magnetic assemblages about the gap 2.

FIG. 7 illustrates a preferred embodiment having eight more side "helper" elements 54 added to the embodiment of FIG. 6. This illustrates an example of at least two side magnetic assemblages 54 extending between the at least two magnetic assemblages 5 to surround the magnetic media 42 on four sides when disposed in the gap 2. Using the example size and strength elements discussed above, the side helper elements 54 are positioned beyond the gap 2 width for media passage with each element 54 covering approximately half of the gap 2 distance. The side helper elements 54 then virtually cancel fringing effects and provide a gap 2 width over 5.25 inches wide. The result is a horizontal field strength nearly equal to the example of FIG. 3 using thirty-two permanent magnet elements instead of forty.

Various other arrangements of the side helper elements are possible, and the use of such side helper elements can provide magnetic strength and field uniformity benefits in a variety of applications. Permanent magnets of size aspects other than 2×2×1 could be fit at the gap sides or into voids left by shifting lateral magnets to the gap sides, or magnets at the gap sides could be placed three-high and overlap the steel plate edges. In another example, twelve helper elements could be applied either three-wide separated by the gap entrance or three-deep and touching along the gap sides without interfering with eight other two-deep helpers touching at the sides or two-wide helpers at the gap entrance.

Permanent magnet structures containing more conventional magnetic circuit techniques can also benefit from Halbach-like additions. Such structures can consist of permanent magnet poles attracted to steel plates to form parts of the magnetic circuits with additional permanent magnet elements applied to the outsides of one, two, three, or all four sides. The horizontal direction of magnetization "pushes" additional magnetic flux into the magnetic pole elements and further concentrates the flux density into the gap containing the working magnetic field.

Often, at least a slight strength advantage can be gained through the selection of certain magnetic materials. Preferably, the permanent magnet elements comprise a high energy grade of sintered neodymium-iron-boron elements, often denoted by an "N" prefix by vendors. The choice of material is informed by weighing the variables of cost, assembly effort, weight, and size, especially from the number of necessary elements, against the resulting magnetic field strength. In some cases, the achievement of ultimate strength can offset the cost of higher grade material.

The assembly of Halbach-like structures can take different sequences. One sequence preferred for horizontal generators is to assemble element pairs in attraction and then assemble a grouping of five elements with mix of attraction and repulsion to create a single assemblage. The two-layer embodiment can follow that with an attractive ten element step. Attraction to the steel plate aids in the repulsive assembly of five- or ten-unit groups to each other, which precedes the less magnetically repulsive step of placing the identical assemblage halves in mirror image to each other. That final step typically involves a large placement force.

Such assembly sequences typically involve tooling in the form of custom holding, positioning, clamping and alignment fixtures, which may take various forms as recognized by those skilled in the art. Except for the final application of structures to hold the assemblage halves opposite each other about the gap 2, glue such as Versalock(r) glue can hold the various segments or elements to each other temporarily. Tooling for steps like the five-unit portion typically needs to provide clamping and alignment to all six sides before the glue sets. Some miss-alignment due to element dimensional tolerance and non-contact at glue joints may be tolerated and can be handled with adjustability in the support structure such as through using slotted bolt holes. Alternatively, a gap height adjustment mechanism can be provided to adjust for magnetic media form factor thickness and magnetic field strength.

A difficulty can arise in generating the appropriate magnetic field strength in the middle of a large gap. To achieve these field strengths, the field intensities may exceed the permanent magnet intrinsic coercivity over some portion of the permanent magnet elements that generate the magnetic field. Coercivity is a measure of the amount of outside magnetic field that can be applied to a permanent magnet to bring the overall field to zero and exhibit the same magnetic filed properties when the outside applied magnetic field is removed. Intrinsic coercivity is a measure of a permanent magnet material's internal magnetic properties to withstand an outside magnetic field before the magnetic field created by the material is irreversibly changed or removed. The intrinsic coercivity value is the strength of the outside field needed to irreversibly change or remove the magnetic field created by the material. Note, however, that the magnetic properties of the permanent magnet material can be restored in whatever direction, by the application of typically the same applied field strength used to de-magnetize the material. Thus, exceeding the coercivity or intrinsic coercivity of a permanent magnet can result in a partial or complete demagnetization of a portion of the permanent magnet, thereby affecting overall magnetic field strength.

A finite elements analysis (FEA) done using ordinary commercial software known in the art can identify but typically does not quantify that demagnetization effect. For example, a simulated horizontal generator embodiment using high energy grade N48 permanent magnet elements should produce about 1.4 T according to an FEA analysis, whereas the same physical horizontal generator embodiment results in about 1.03 T due to the flux leakage within, and partial demagnetization of, the permanent magnet materials.

Although some localized partial demagnetization can be tolerated, limiting the magnetic reversal and demagnetization can provide a distinct advantage. Permanent magnet materials are available in wide range of properties including the flux density, coercivity, and intrinsic coercivity of the material. One way to limit flux leakage and localized partial demagnetization is to select permanent magnet material grades with high coercivity at the expense of the flux density that the material can support. For example, material selection for maximum coercivity typically involves the selection of grades N42H or N45H that typically limit the regions where reverse field intensity exceeds coercivity causing flux leakage or localized partial demagnetization, whereas the selection of materials with grade N50 or even grade N48M typically increases the flux density but may increase the flux leakage or localized partial demagnetization.

Selection of material with a preferably high intrinsic coercivity over coercivity can provide an additional advantage by limiting the regional extent and degree of partial demagnetization by reverse field intensity. Such selection can also provide a stability of magnetic strength against the extremes of ambient environmental temperature, for example where storage temperatures may be higher than operating temperatures. The margin of intrinsic coercivity to coercivity can reduce any irreversible effect of an extreme ambient storage temperature thereby allowing a more or less reversible return to the original magnetic strength at operating temperature. Selective application of grade N42SH, for example, provides a significant increase of intrinsic coercivity with very little reduction of coercivity as compared with grade N42H.

Application of temperature resistant or high intrinsic coercivity suffixed grades materials, however, can come at a significant economic cost in addition to the penalty of reduced stored energy capacity. For instance, lower energy high temperature grades may cost approximately 30% more than highest energy low temperature grades due in part to the very rare additives used in the material's formulation. Simulations indicate that excess field intensity and flux density reversal are typically greatest in regions within the horizontally magnetized portions of the horizontal magnetic field generating assemblages.

Given these factors, a permanent magnet magnetic media degausser may include a plurality of permanent magnets 40 and 41 creating a magnetic field to erase magnetic media 42 wherein at least a first permanent magnet 40 has an intrinsic coercivity higher that at least a second permanent magnet 41. Preferably, the first permanent magnet 40 directs its field directly into the second permanent magnet 41, and the second permanent magnet 41 has a higher remanence than the first permanent magnet 40.

Such selective application of suffixed grades to horizontally magnetized regions of the magnetic assemblages typically increases the overall financial cost by only a few percent with a potential improvement in magnetic strength of approximately several percent. Higher permanent magnet grades, as will likely become available, are equally applicable to the various embodiments of the invention. Furthermore, nominal characteristics and production tolerances of permanent magnet materials are such that the physical embodiment of materials with lesser ratings could measure stronger than the physical embodiment of material with higher grade rating. Thus, the prudent selection of materials at a given point in time may vary.

Passage of Magnetic Media Through the Field

Figure 8:
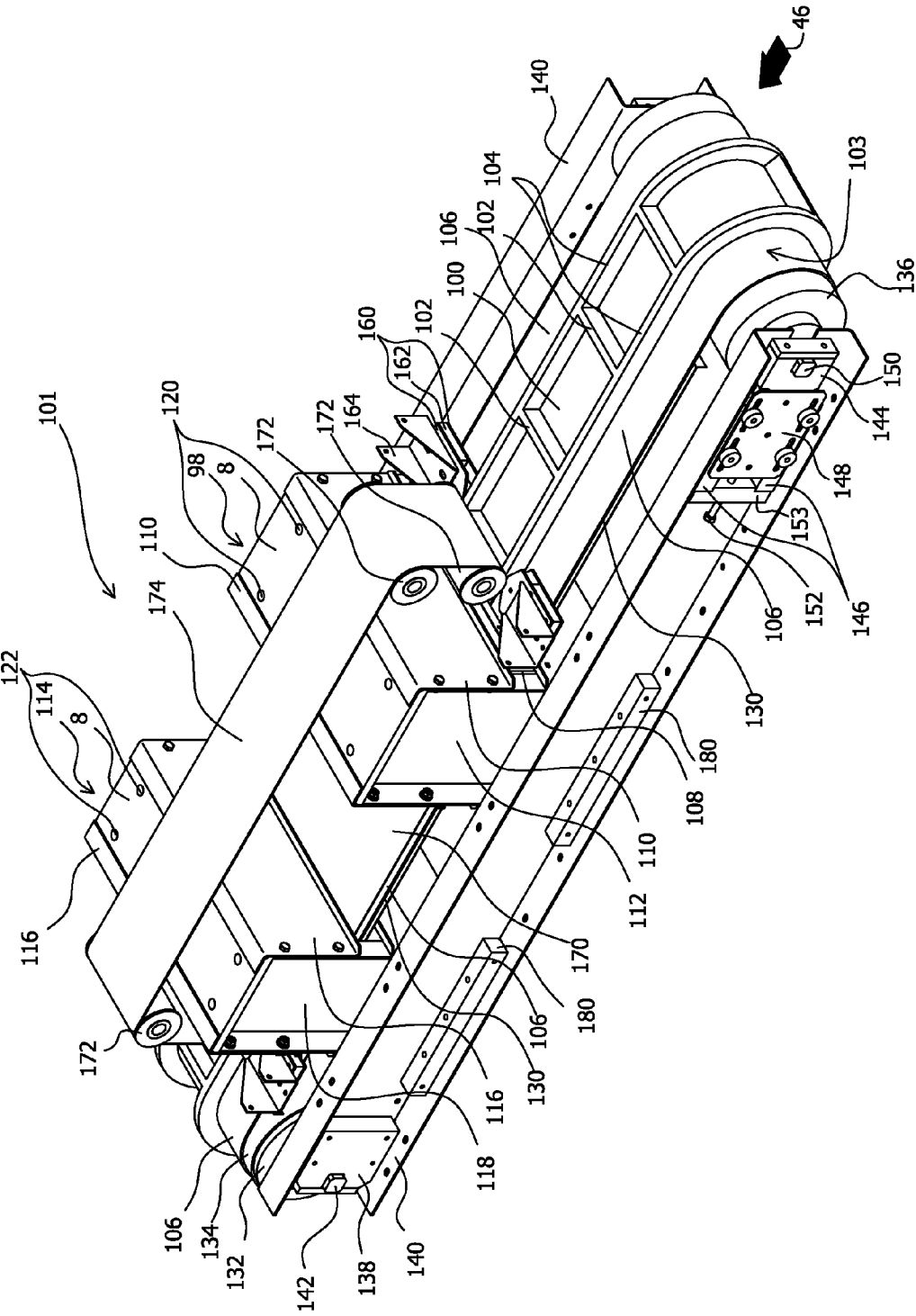
FIG. 8 is a perspective view of a permanent magnet degausser with a cleated conveyor belt in accordance with various embodiments.

Magnetic storage media can be moved through the applied magnetic fields by various means. For a stationary application where many magnetic media such as hard disk drives are directed to a centralized point for erasure, high throughput can be achieved with a motorized one-way conveyance of each disk drive through the gap 2 or a lineal series of gaps containing one or more magnetic fields. With reference to FIG. 8, such a device 101 may include at least one magnetic field generator 98 and/or 114 comprising magnetic elements arranged near a media conveyance path 46 generating a plurality of magnetic field directions in the magnetic media conveyance path 46. The degausser device 101 also includes a cleated conveyor belt 103 defining magnetic storage media bins 100 wherein the cleated conveyor belt 103 moves substantially linearly through the magnetic media conveyance path 46. In some alternatives, a passive belt 174 at least partially surrounds and is movable around the magnetic field generator(s) 98 and/or 114.

The stationary application can employ enough permanent magnet material to allow for an increased gap 2 between the magnetic assemblages of the magnetic field generators 98 and/or 114 to fit hard disk drives, the cleated conveyor belt 106, and the passive belt 174 to process hundreds of thousands of hard disk drives with reduced energy costs. For example, the peak pulling force needed to extract two typical hard disk drives simultaneously from two 1 T magnetic fields at a speed of four inches per second typically requires no more than 2 kW of peak power. Aside from motor heating, permanent magnets typically generate only a few watts of heat due to eddy currents in the hard disk drives moving through the magnetic fields. Electromagnet embodiments with a similar capability often consume over 25 kW, which mostly becomes heat that needs to be removed from the electromagnets.

The plurality of magnetic field directions created by the magnetic field generator(s) 98 and/or 114 preferably further include magnetic field directions in at least a substantially horizontal field direction and at least a substantially vertical field direction with respect to the magnetic storage media. A substantially vertical field direction is preferably generated by a preferred vertical magnetic field generator 98 including vertical magnetic flux return members such as a steel member 108 behind certain stainless steel "Z"-shaped members 110. The vertical magnetic flux return members 108 can vary somewhat in their distance from the generator magnets, but likely will constrain the lateral width 106 of the conveyor belt 103. Formed stainless steel members such as end member 112 can supplement the support of vertical magnetic flux return members 108, which are analogous to the supports 30 communicating with gussets 32 seen in FIG. 2. The "Z" members 110, flux return members 108, end members 112, and gussets cooperate with each other in stiffening against the attractive force between the vertical generator 98 halves. The "Z" members 110 can also serve as a mechanical constraint against the repulsive forces among the permanent magnet members of the vertical field generator 98.

A preferred horizontal magnetic field generator 114 also utilizes "Z" members 116 and end members 118 formed of stainless steel sheet, but to attach the magnet assemblages in repulsion. As a result of the commonality of "Z" members 110 and 116, steel plate holes 120 of the vertical generator 98 are placed inward to attach steel gussets between them and the vertical steel plate 108, relative to the outwardly placed holes 122 of the horizontal generator 114 used to attach nonmagnetic gussets of similar form between them and the nonmagnetic channels 118.

The steel plates 108 and "Z" members 110 and 116 can also support formed additional stainless steel support members (not shown) between them with web faces parallel to the supports 30 and in contact with the outer portions of the permanent magnet elements of segments 4 and 6 seen in FIG. 1.

Sideways forces, for example due to the interaction of typically asymmetric arrangement of ferromagnetic structures within hard disk drives with the magnetic fields, might cause accumulated miss-tracking of the conveyor belt 103 toward fringing regions of the applied magnetic fields in the gaps 2. The belt 103 preferably engages a plurality of rotatable drums such as pulleys, drums, or rollers 132 and 136. Belts 103 with side walls 104, excess width 106, or both may utilize crowned rollers 132 and 136. Alternatively, sprockets may be applied to holes in the excess belt width 106. In a further alternative, Vs formed on the inner surface of the belt 103 may interact with features such as grooves cut into the surface of the conveyor rollers 136 and 132. In a preferred embodiment, assemblies including rollers mounted between plates 160 attached to the block 162 can constrain the conveyor belt 103 side walls 104 to limit lateral miss-tracking. Preferably, the blocks 162 slide laterally using slotted holes in the support brackets 164 to provide horizontal positioning adjustment near or against the side walls 104. Additionally, the brackets 164 and blocks 162 may slide for vertical adjustment on other support structures such as those for the passive belt rollers 172.

The belt 103 preferably has a composite web construction with cleats 102 applied by adhesive bonding, thermoplastic welding, or other fastening means. The belt 103 can overcome the attractive forces between the media and the magnetic assemblages 98 and/or 114. To limit the amount of permanent magnet material needed, cleated belts 103 can be furnished with side walls 104 that insure constraint of the magnetic media within the effective field in the gap 2. The side walls 104 can be slit at intervals to accommodate the radius of curvature for the conveyor rollers 132 and 136. Such belt technology is commercially available in semi-custom or fully-custom form, for example from Sparks Belting or Midwest Industrial Rubber, so that the cleat 102 and side wall 104 thickness and position can be specified as needed to erase a particular magnetic storage media form factor. To withstand the shocky attractive force applied by a typical hard disk drive's traveling through the applied magnetic fields, the cleats 102 are preferably about 0.5 inches thick and bonded to the side walls 104, although other sizes may be used for a given application. To strengthen the belt 103, wider belt portions 106 can extend beyond the magnetic storage media cavity 100 and the side walls 104. In some embodiments, the increased gap 2 thickness necessary to allow passage of the belt 103 with cleats 102 and side walls 104 with other protective measures justifies a doubling of the permanent magnet materials to provide sufficient erasure magnetic fields in the gap 2.

Ferromagnetic components concentrated toward the upper surface of magnetic storage media can cause gravity-countering upwards attraction. A preferred protection for the upper assemblages of the magnetic field generators may include a passive upper belt 174 passing over a plurality of freely rotatable pulleys or rollers 172 disposed around at least a portion of the magnetic field generator(s) 98 and/or 114 such that the passive belt 174 moves in a direction substantially similar to the direction of the cleated conveyor belt 103. Preferably, the passive upper belt 174 bears upon the upper rigid liner 170. The protective liner(s) 170 typically include a single formed stainless steel sheet 130 extending through the gaps 2 to protect the magnet assemblies 98 and 114. The liner 170 can be of minimal thickness.

Whenever upward media attraction occurs and media friction characteristics such as pointy circuit board components exceed the passive belt 174 to liner 170 stopping friction, the belt cleats 102 act on the media to drag it, in turn dragging upper belt 174 along upper liner 170 until the media clears the attractive region. Idler rollers 172 of the flanged type can guide the upper belt 174 when dragging occurs, due to its minimal motion. The idler rollers 172 may include minimal means for tracking and tensioning adjustment not shown for clarity. The passive belt arrangement requires no synchronization between the passive and driven belts 174 and 103, and the upper belt 174 can be made quite thin to minimize gap penalty. Further, the passive belt 174 is relatively easy to replace at low cost in the event of wear.

Support rails 140 provide for the attachment of various components including, for example, support blocks 162, axels for the upper belt rollers 172, and end adjustment means for the upper liner 170. Blocks between the field generators and attached to the upper surfaces of the rails 140 may support an additional upper liner 170 adjustment means. Laterally bracing members attached between the rails 140 additionally support an adjustment means of the lower liner 130. Two pairs of legs with various bracing members attached near the ends of the rails 140 and a foot member between each leg pair provides for attachment of leveling pads for overall support. Bracing means between the leg pairs support a control enclosure for an emergency stop controller, protective fuses, motor drive, and similar controlling components.

The magnetic field generators 98 and 114 are typically heavy. Bracing members 180 can provide supplemental support at their attachment points near the bottom flanges of the rails 140. Horizontal bracing members extending between the roller 172 support members to act against upper belt 174 tension can attach to the tops of the magnet assemblies 98 and 114. Additional lateral horizontal bracing can be added in the direction of the upper roller 172 axes. Because the vertical support members and the magnet assemblies impart strength to such horizontal bracing, eye bolt blocks and eye bolts can be affixed near the top of the degausser 101 to facilitate its lifting by hoist during installation.

The degausser 101 may employ a motor operatively coupled to the drive roller 132 by belts, chains, gears, or the like. A preferred embodiment utilizes a motorized pulley, drum, or roller 132 instead of a belt driven by an external drive mechanism. Such an embodiment reduces in number and complexity the guards for any moving parts. Also, motors sealed within the drum 132 can sit in an oil bath to promote heat transfer and lubrication, resulting in nearly maintenance-free operation, needing oil-changes approximately every 40,000 operating hours. Another benefit includes that such motors are commonly available in the form of motorized crowned rollers to promote guidance without flanged sprockets or the like.

The pulley 132 diameter and width can be sized as appropriate to eliminate the need for more than one similarly sized idler 136 or pinch rollers to supplement the friction driving the belt 103. Typically, the pulley length tends to be larger in size than the magnetic storage media form factor, facilitating excess belt width 106 for strength and supplemental tracking means. Lagging 134 placed on the surface of the drive pulley or drum 132 improves surface friction. Lagging 134 on a wide pulley can also provide sufficient thickness to accommodate grooved guidance means such as V profiles on the inside of the belt.

A fixed axel block 138 attached to the rail 140 supports the motor pulley axel 142 at each end of motor pulley 132. A second axel block 144 that is adjustably translatable via rails 146 and a retainer 148 supports each axel end 150 of idler 136. A bolt 152 acts through a threaded end block 153 on the adjustable block 144 against the tension of the belt 103 on the idler 136, such that the pair of axel blocks acting on the idler 136 ends 150 provide for tensioning and tracking adjustments.

The motorized pulley 132 may be optimized in terms of power supply and operation parameters for a given location or type of operation. For example, a variable frequency drive suits an embodiment that might operate at speeds faster than suited to human loading. Further, variable frequency drives can be made to double voltage so that only a slightly different model can supply ¾ horsepower from a 120 volt North American power supply. Variable frequency drives can address other problems and requirements caused by the varying loads of media attraction, such as more or less active feedback speed regulation against load variations and electronic motor overload protection against low duty moderate overload.

Figure 9:
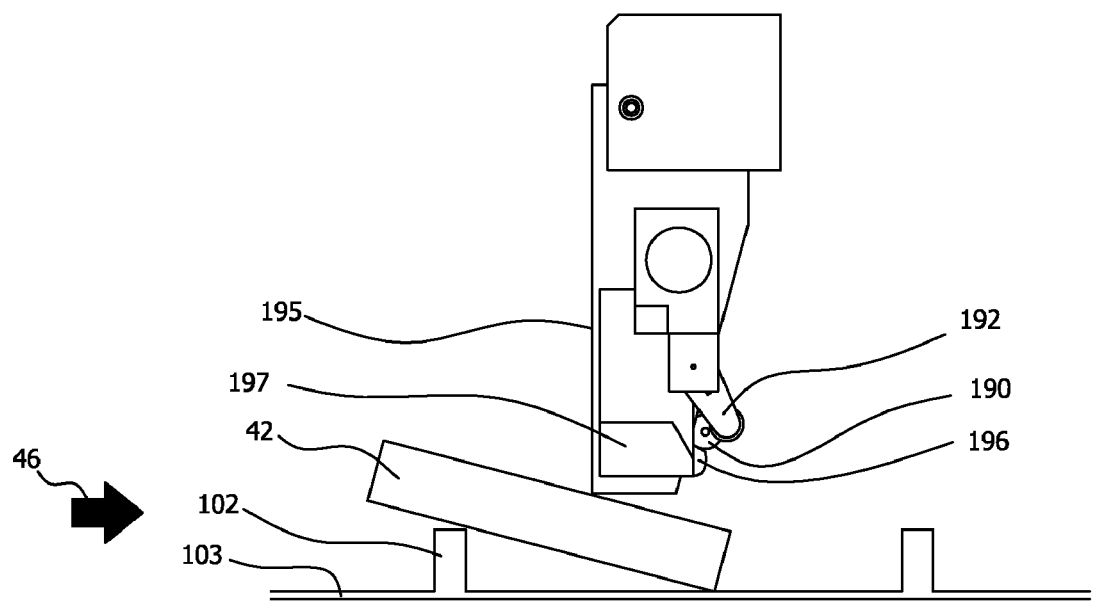
FIG. 9 is a side view of a media miss feed in a permanent magnet degausser in accordance with various embodiments.
Figure 10:
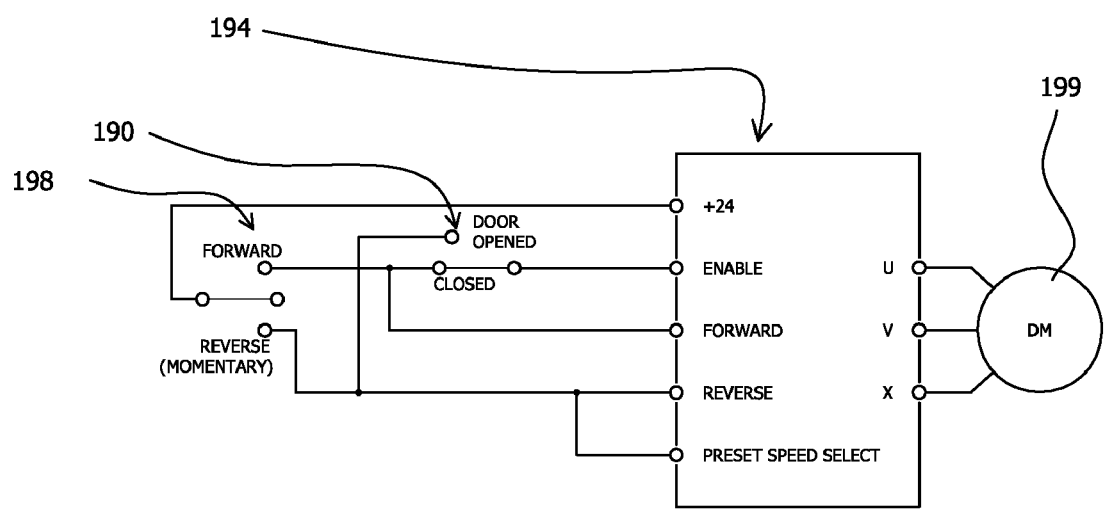
FIG. 10 is a block diagram including a wiring diagram of a protective sensor connected to a direction selector and a motor controller of a permanent magnet degausser in accordance with various embodiments.

Referring to FIG. 9 and FIG. 10, the belt 103 and cleats 102 may cause pinch points and the potential for media jams at the magnetic assemblages 98 and/or 114. Typically, a control mechanism 194 is operatively connected to the motor 199 of the motor pulley 132. At least one sensor 190 and/or 192 is disposed in a spaced relationship with the belt 103 and operatively connected to the control mechanism 194 having various programmable control terminals such that when an object such as a disk drive, human extremity, or other object contacts the cleated conveyor belt 103 and a portion of the apparatus 101 operatively connected to the sensor(s) 190 and/or 192, the control mechanism 194 stops operation of the motor 199. Alternatively, at least one sensor 190 and/or 192 is disposed in a spaced relationship with the cleated conveyor belt 103 and operatively connected to the control mechanism 194 such that when a foreign object contacts the cleated conveyor belt 103 and another portion of the apparatus 101 operatively connected to the sensor(s) 190 and/or 192, the control mechanism 194 stops operation of the motor 199 and enables reverse operation of the motor 199.

Preferably, a first sensor 190 with rest position in contact with a first sensor cam 196 detects minute motions of a hinged door 195 caused by, for example, human extremities and miss-feeds of media 42, and a second sensor 192 and a corresponding second sensor cam 197 placed downstream from the first sensor 190 triggers an emergency stop system. The first sensor 190 can disable the continuous forward motion of the conveyor 103 but allow reverse motion, for example through a rotary selector switch 198 to allow momentary reverse motion of the conveyor 103. Such normal forward and jam-clearing momentary reverse actions can be at different speeds, for example at a productive preset forward speed and a safer slow reverse speed. Those skilled in the art of applying variable frequency drives will know that such functionality is inherently programmable in most standard models without recourse to external logic beyond the sensor connection and drive connection to a few switch contacts and accessories.

The second sensor 192 can be safety-rated to interact with similarly rated industrial controls that remove all power from the variable frequency drive. An advantage of the motor pulley 132 described above is that its gearing friction causes a nearly instantaneous cessation of motion in the event of a "power loss trip" of a typical variable frequency drive without resorting to complicated breaking mechanisms. Although activation of the second sensor 192 prevents motor functionality for jam clearance, the motor gearing friction is not so high as to prevent manual rotation. Thus, a jam or a near jam, where miss fed media lodges at the mouth of the magnet structure or merely approaches it and trips the second sensor, can be cleared without extraordinary measures.

Such embodiments for conveyorized erasure of magnetic storage media are preferably employed in production environments, such as for operations of large recycling services, that guarantee to protect information on a variety of magnetic storage media contained within the waste stream obtained from many clients. One advantage is the low energy demand of the motor and the lack of energy consumption and heat generated by using permanent magnets instead of electromagnets common to the art of conveyorized magnetic storage media erasure.

In other environments, fast operation is also desired, but media quantities tend to be smaller, and while motorized power operation is often desirable, assured operation in the face of power loss is typically more preferred. Such environments typically teach a preference for lower overall weight at the expense of the highest attainable magnetic strength, and discount extreme long life versus operational readiness. The approximate doubling of magnetic strength and the addition of a vertically directed magnetic field, as is available in certain embodiments, can address these concerns while simplifying media transport and separating components that are more sensitive to debris created by high volume media erasure.

An alternative embodiment of the invention with a "bottomless/topless" conveyance and less protection for the magnetic assemblages, thereby enabling a smaller gap 2, can serve to erase individual hard disk drives near a point of use as they fail. Such an embodiment can also be if several hard disk drives need to be erased in a hurry, for example in the case of emergency destruction of information. Drive means for such a conveyance may be manual such that no power is needed, electrically operated by battery powered motor, or both with suitable transmission means to switch between the drive means.

A further alternative includes the use of a chain drive where the spacing between the links and rollers accommodates a particular magnetic storage media form factor or form factors up to some particular maximum. Links of such an oversized chain drive could be attached by plates, for example fixed plates forming media cavity bottoms and hinged plates forming media cavity tops. Both plates can be hinged to facilitate gravity assisted top loading and bottom ejection. Sprockets needed to drive such an outsized chain tend to be large.

The chain size can be greatly reduced by attaching it to magnetic storage media-sized bins or a similar structure. Preferentially, one chain per bin side avoids an undue increase in the field generating gap dimension. Those skilled in the art will realize that the pitch of such parallel chain drive demands precision, and shocky loads can cause problematic inelastic stretch.

Reciprocating Conveyor

Figure 11:
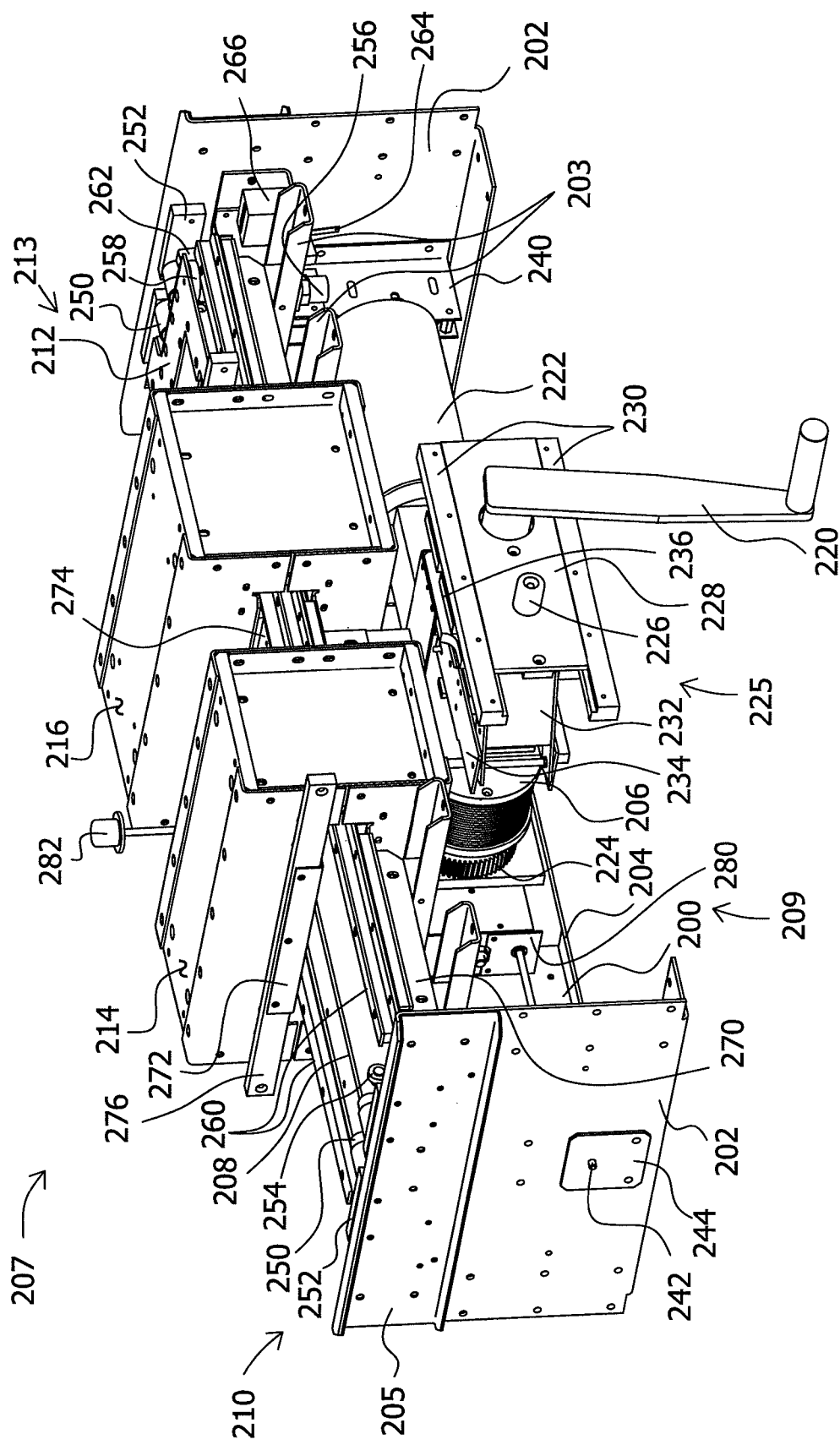
FIG. 11 is a perspective view of a permanent magnet degausser with a reciprocal media conveyor in accordance with various embodiments.
Figure 12:
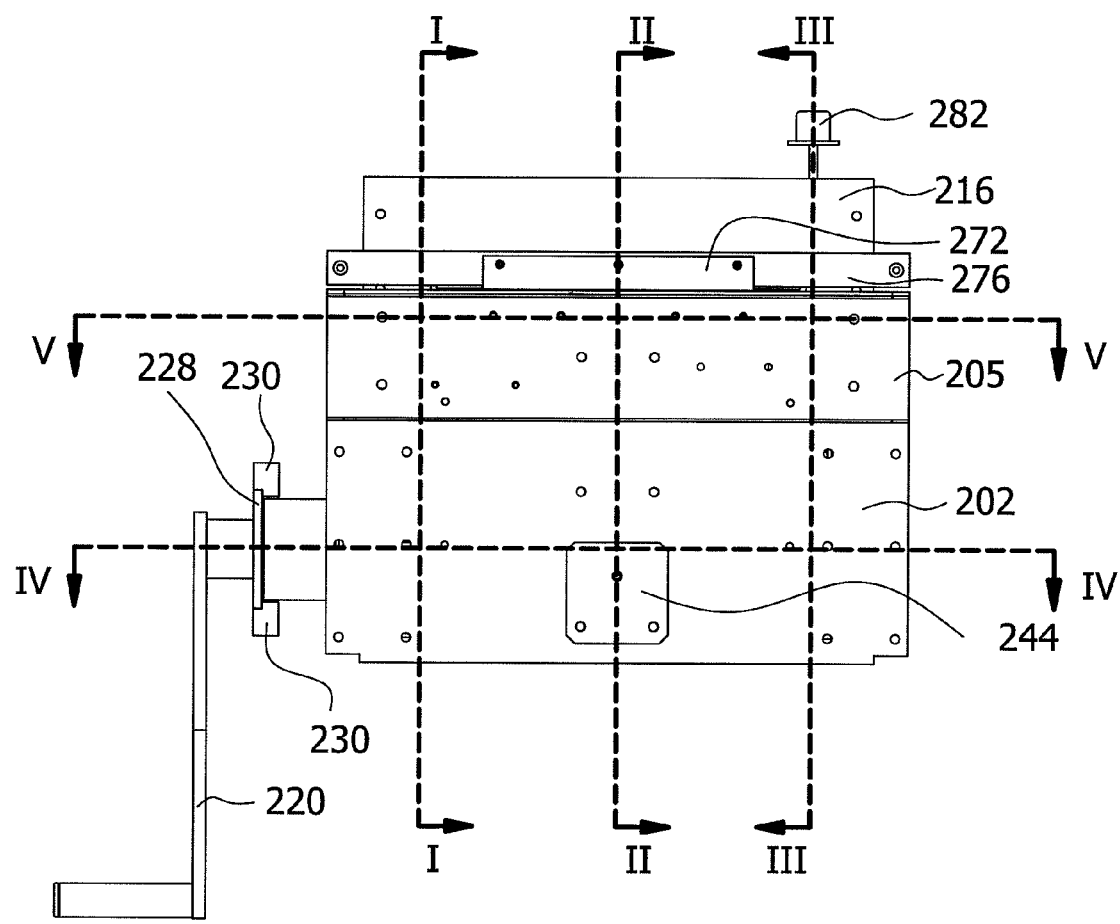
FIG. 12 is an elevational view of the permanent magnet degausser of FIG. 11 demonstrating various cross-sectional views.

With reference to FIG. 11, an alternative embodiment of a degausser 207 includes providing a reciprocal media conveyor generally designated with reference numeral 209 including a magnetic storage media bin 212 movable along the magnetic media conveyance path wherein the magnetic storage media bin 212 passes substantially through the at least one magnetic field generator 214 and/or 216 when traveling in any direction along the media conveyance path and is accessible at both ends of the magnetic media conveyance path.

In contrast to a typical two-pass process that rotates media outside of and between two passes through a horizontal magnetic field that requires operational floor space and a relatively long transport stroke, a reciprocal conveyor degausser 209 with unload and load stations at each end of a single pass process uses relatively little operational space while eliminating the long process stroke. Further, providing media unload and load stations at each end of a reciprocating transport can approximately double the media throughput over a two-way reciprocation of media while eliminating the need to reorient the media in between passes. Yet another advantage of the embodiment includes having quadrilateral symmetry such that many parts may be common to the various portions of the degausser 207. The detailed description that follows with the accompanying figures often references or shows parts on one side or end while omitting them from the opposite side for clarity.

Although reciprocation of a media transport 212 between unload and load stations at each end of an erase process can be accomplished by a variety of means well known to the art including lead screws, drive chains, toothed belts, rack and pinion gearing and the like, such means have certain disadvantages. Magnetic field generators 214 and/or 216 that counter fringing through selective placement and orientation of permanent magnet material at the sides of the gap typically would preclude placing most such drive means at the sides of the conveyor 209. Such embodiments can also incur the expense and slowness of lead screws or poor performance against shocky loads. Rack and pinion gearing presents a particular problem in that a rack attached to a media transport incurs considerable length.

A preferred embodiment of the single pass two station magnetic storage media degausser 207 provides at least one flexible drive element 204, such as a rope or cable, with its ends attached to the media storage bin 212, wherein the cable 204 wraps a plurality of times around a cable drum 206. The flexible drive element or cable 204 is preferably a wire rope. An advantage of using a wire rope is that its dragging action in tension effectively counters the media attraction created in the magnetic field. Preferably, the wire rope 204 includes a number of fine strands of multiple wires each to increase its strength and resistance to shocky loads and to reduce the diameter of the drive components. Also, stainless steel or other generally nonmagnetic wire rope is preferred over typical wire rope. Coatings are also available such as vinyl to improve the friction between the wire rope 204 and the cable drum 206.

Typically, the conveyor 209 includes grooved rollers acting on rods, V-guides, dove tail, re-circulating ball linear bearings, or the like. Preferably, the conveyor 209 also includes least top and bottom liners to protect the permanent magnet elements. Additional liners at the gap's sides can provide additional transport guidance. Features such as corner fillets and low friction sides or corners can enhance simple guidance along the fixed liners.

With reference to the drawings, and in particular FIG. 11, a preferred embodiment includes a reward frame channel 200 attached to formed end frame plates 202 that support various components such as lower liner support channels 203. A corresponding forward frame member has been omitted to reveal a lower drive cable portion 204 bearing on the cable drum 206. End frame plates 202 can support channels 205 reinforcing against the impact at the end of travel. An upper drive cable portion 208 at the near end 210 can pull the media transport shuttle 212 through the gaps of a horizontal magnetic field generator 214 and a vertical magnetic field generator 216.

The cable drum 206 can be driven through a plurality of gears by various means such as a hand crank 220 or a gear motor 222 acting on a cable drum spur gear 224. The cable drum 206 also may be operatively attached to a clutch 225 that operatively engages the cable drum 206 to the hand crank 220 and the motor 222. The clutch device 225 includes an actuation knob 226 attached to a sliding plate 228, sliding plate tracks 230, a variable length link arm 232, a pivoting clutch arm 234, and a bearing block 236. The clutch 225 is shown in the position for hand crank 220 operation. A hole in the sliding plate 228 allows the engagement of the crank 220 to a driving means, and a link arm 232 acting on the clutch arm 234 disengages the motor 222. As an interlock against the gear motor's 222 hazardously driving the hand crank 220, the hand crank 220 typically must be removed before the clutch 225 engages the gear motor 222 to the cable drum 206.

Pulley assemblies at either end of the degausser 207, including angled mounting brackets 240, reverse the direction of the drive cable 208. A nut (not shown) acting on the end of an adjusting bolt 242 against a bearing plate 244 tensions the drive cable 208 to help ensure adequate friction against the cable drum 206. This adjustment mechanism allows for adjustment in the case of cable stretch and slippage and can be placed at either or both ends 210 or 213 of the degausser 207.

Bumpers 250 are attached to support blocks 252. A limit switch roller 254 is located to activate a switch 256 just before contact between the shuttle 212 and the bumpers 250. The bumpers 250 define the limits of shuttle 212 travel between the unload and load stations at the ends 210 and 213. Rollers 258 attached to the shuttle 212 engage rails 260 to limit the suttle's 212 lateral position within the fields generated by the magnetic field generators 214 and 216.

The limit switches in combination with momentary push button switches can selectively disable the motor 222. The normally open contact of an activated limit switch can illuminate a momentary push button. The push button can be configured to allow forward or reverse motion depending on the motor polarity determined by the active relay of an H-bridge connected SPDT relay pair. Push button switch illumination can signal which switch to activate to drive the shuttle in direction away from the activated limit switch. A third non-illuminated push button switch can be added to enable the directional push buttons, providing for two handed control. Thus, battery power and simple ladder logic can provide for the effective control of a motorized embodiment.

In practice, a suitable gear motor includes the Groschopp PM10818-RA4000M. Suitable automotive relays include the Omron G8JN-1C7T-MF-R-DC12. Alternatively, the control circuit can be adapted to electronic controllers including packaged controllers such as Winland WMC140-0120270-L0W, providing benefits such as soft start to reduce cable stretching shock. Other suitable motors and controls may be applied.

Bed liner sides 270 where media may be dropped into load stations can be formed of a relatively heavy gauge stainless steel for rigidity. The liner sides 270 can then support a vertical adjustment mechanism for a lower thin stainless steel liner above it. A formed end 272 of a thin stainless steel upper liner 274 can attach at various locations such as to a brace bar 276, which can be provided with a vertical adjustment means (not shown). The liner 274 may also be attached loosely so it can float atop the shuttle 212. Therefore, the shuttle 212 can transport magnetic storage media while liners protect the permanent magnet assemblages of the magnetic field generators 214 and 216 against attractive contact with the to-be-erased media.

The shuttle 212 can also act through the upper end of a pivot arm 262 on the vane 264 of a non-resetable mechanical counter 266 to provide a count of total operational cycles divided by two. A knob 282 can disengage a bidirectional latching one-way clutch mechanism operatively engaged to the cable drum 206 in the event of a jamming malfunction.

Figure 13:
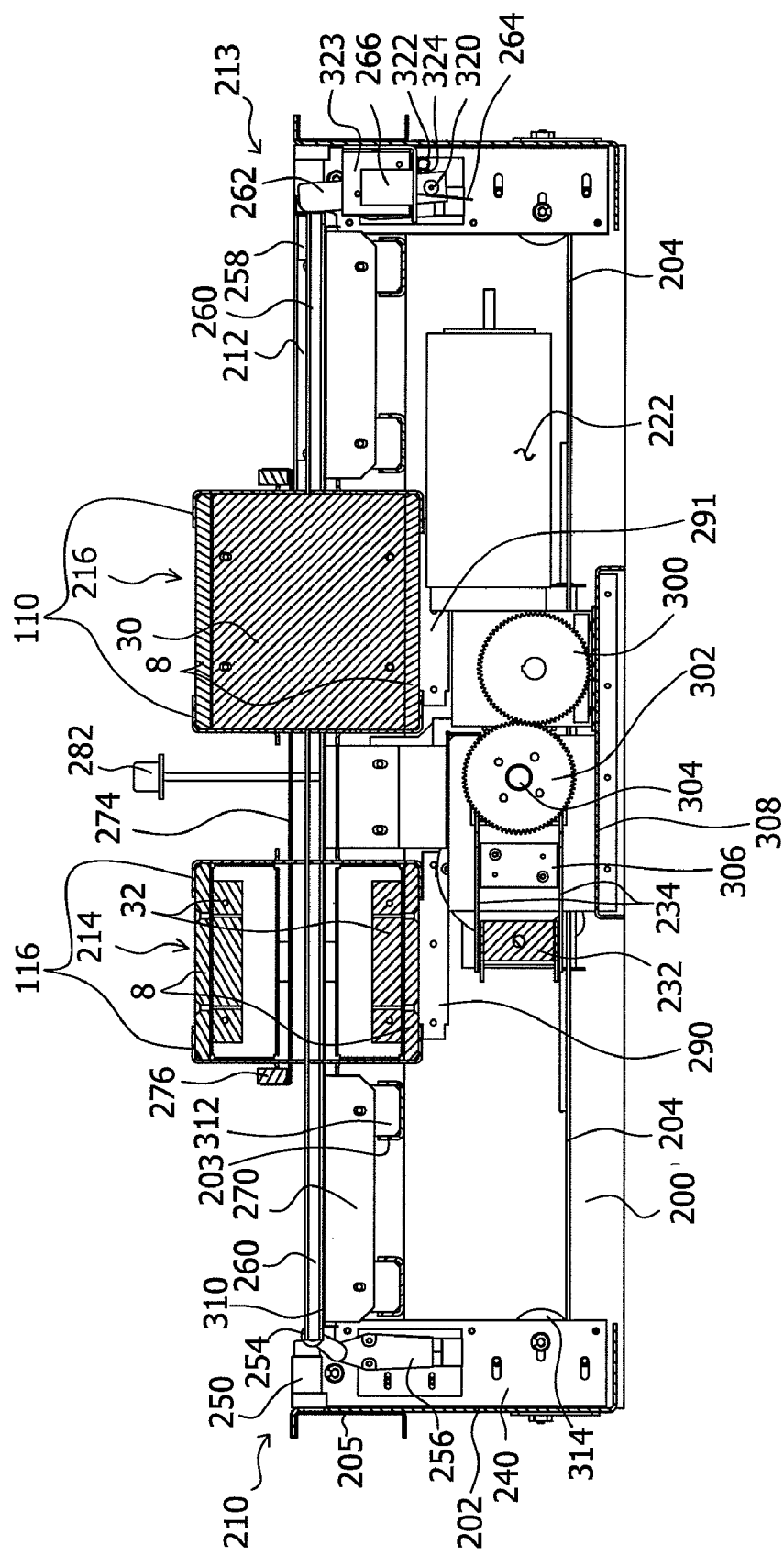
FIG. 13 is a view of the permanent magnet degausser of FIG. 11 along the cross sectional view I of FIG. 12.

With reference to FIG. 13, a ferromagnetic plate 30 returns flux between the upper and lower portions of the vertical field generator 216. Two nonmagnetic gussets 32 and the z-formed members 116 of the horizontal generator 214 and various permanent magnet containment members such as the z-formed members 110 of the vertical field generator 216 help support the magnetic field assemblages. Such support members can vary in form to fit the various possible forms of the magnetic assemblages. Such members can vary in material and function so as to provide magnetic flux return and compressive strength for the vertical generator or nonmagnetic members to provide tensile strength for the horizontal generator. Machined blocks 290 and 291 support and attach the magnet assemblies 214 and 216 to the frame channels 200.

A pinion gear 300 on the output shaft of the gear motor 222 turns a spur gear 302 about the drive shaft 304. Worm gearing in the motor 222 can provide a gear reduction, allowing the pinion gear 300 and the spur gear 302 to be of a similar size. The spur gear 302 is free to rotate about the drive shaft 304 on independent bearings. Four holes provided in the spur gear 302 mate with the clutch mechanism mounted on the pivoting arm 234. A pivot block 306 for the pivoting arm 234 can contain ball plungers projecting from its upper or lower surfaces and onto the plate surfaces of the pivoting arm 234 bearing holes that provide detent for clutch positions as described in more detail below. A formed sheet metal member 308 attached to the channels 200 supports gearmotor 222 and additional members that rigidly attach to the pivot block 306 and bearing blocks for the drive shaft 304. A heavy gauge lower bed liner 270 is located below the lower liner 310 and between the support and track 260, and the mounting blocks 312 attach to the lower liner support channels 203. Braces 276 support the ends of the upper liner 274. Central support and optional adjustment means for the upper liner are not shown in FIG. 13 for clarity.

The form and various functions of the angled mounting bracket 240 include supporting the limit switches 256 and the cable pulleys, including the pulleys 314 that form part of the position adjusting mechanism for tensioning the cable 204. A formed mounting bracket 323 attached to one of the mounting brackets 240 and the end panels 202 at end 213 supports a counter 266. A projecting rod 320 attached to the lower end of the pivot link 262 registers the shuttle 212 position with the counter vane 264. A spring 322 extended between the frame and an extension 324 attached to the link 262 returns the link 262 to its rest position.

Figure 14:
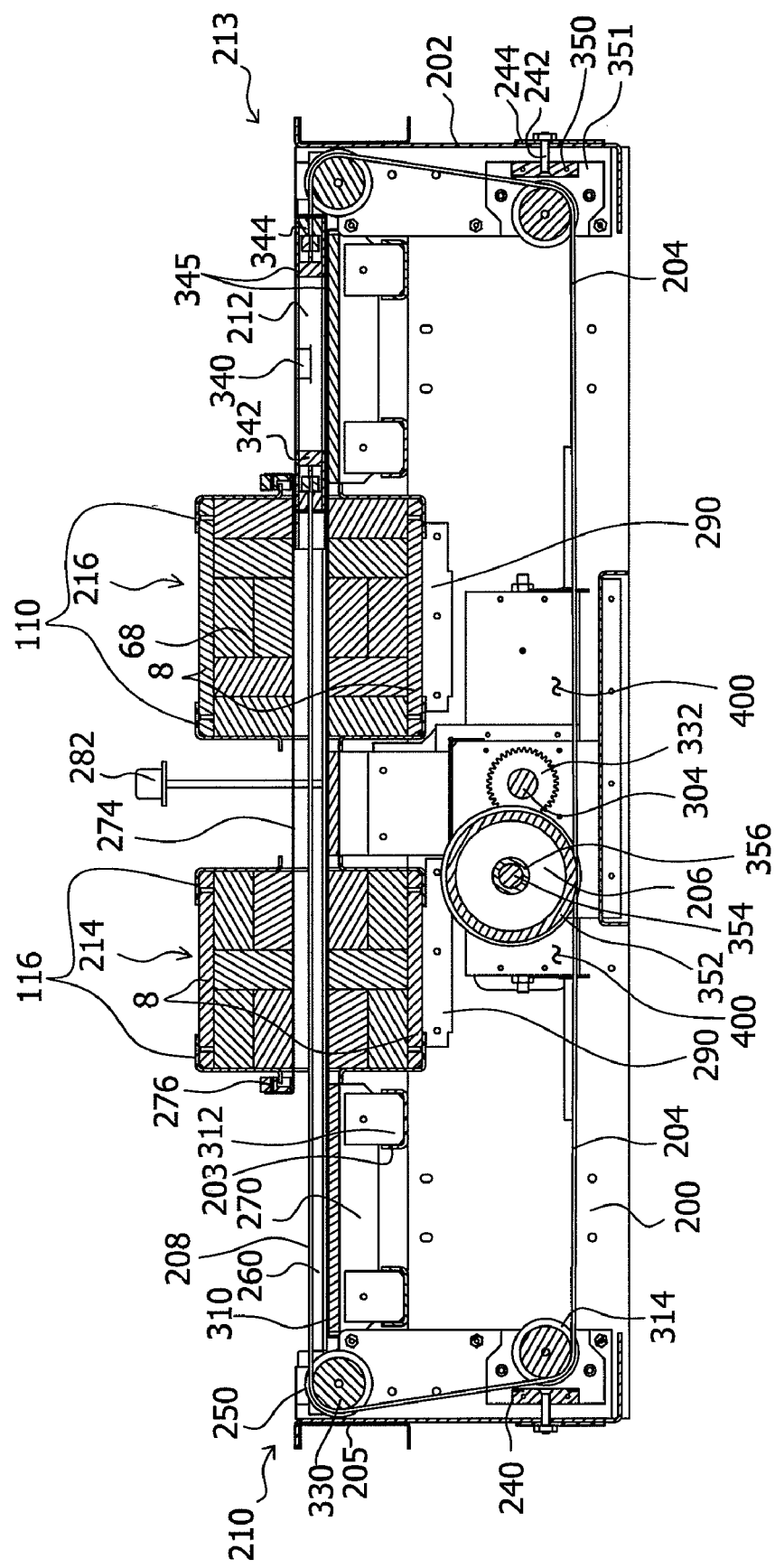
FIG. 14 is a view of the permanent magnet degausser of FIG. 11 along the cross sectional view II of FIG. 12.

With reference to FIG. 14, the drive cable includes a long upper span 208 from the non-adjustable pulley 330 at end 210 to the shuttle 212 and the lower portion span 204 runs between the adjustable pulleys 314 and the cable drum 206. The lower portions 204 typically skew toward the forward and reward ends of the drum 206. Much of the shuttle 212 appears as a cavity with a side wall including a finger niche 340 provided for media removal, inner walls 342 acting on the media, and end walls 344 for cable attachment. Horizontal plate members 345 join the shuttle wall members.

The flat head bolt 242 and its associated nut act against the plates 202 and 244 on the machined block 350 that is secured between pulley housing panels 351. The resulting pull on the adjustable pulleys 314 tensions the cable on the cable drum 206.

The pinion gear 332 that is rigidly affixed to the drive shaft 304 turns a spur gear 224 attached behind the drum 206. The pinion gear 332 operatively engages the mechanism, such as the turning crank 220, to move the shuttle 212. The cable drum 206 is typically hollow with an outer shell 352, an inner axel 354, and a bearing 356. The drum's 206 diameter and the ratio of the pinion gear 332 to the spur gear 302 help determine the force needed to turn the crank 220. Alternatively, gearing in a motor 222 can be selected to suit motor power and provide the desired speed.

A preferred bidirectional latching one-way clutch mechanism operatively engaged to the cable drum 206 will be described with reference to FIG. 15. The drive shaft 304 enters the housing 400 and is pressed into a rotatable disk such as a jam disk 402. The rotatable disk 402 is operatively connected to a moving element such as the cable drum 206 or shuttle 212 through the drive shaft 304 as described above. The jam disk 402 is rotatably disposed in a housing 400 with an inner housing member 404 having at least a first tapered cavity 407 and a second tapered cavity 409 disposed about the rotatable jam disk 402. A first ball 410, a first spring 414, and a first pin 406 are disposed within the first tapered cavity 407, and a second ball 412, a second spring 416, and a second pin 408 are disposed within the second tapered cavity 409. The pins 406 and 408 connect to an actuator arm 418 that is operatively connected to at least two limit detectors. The actuator arm 418 pivots about the axis of the drive shaft 304 and determines the positions of the pins 406 and 408.

Figure 15:
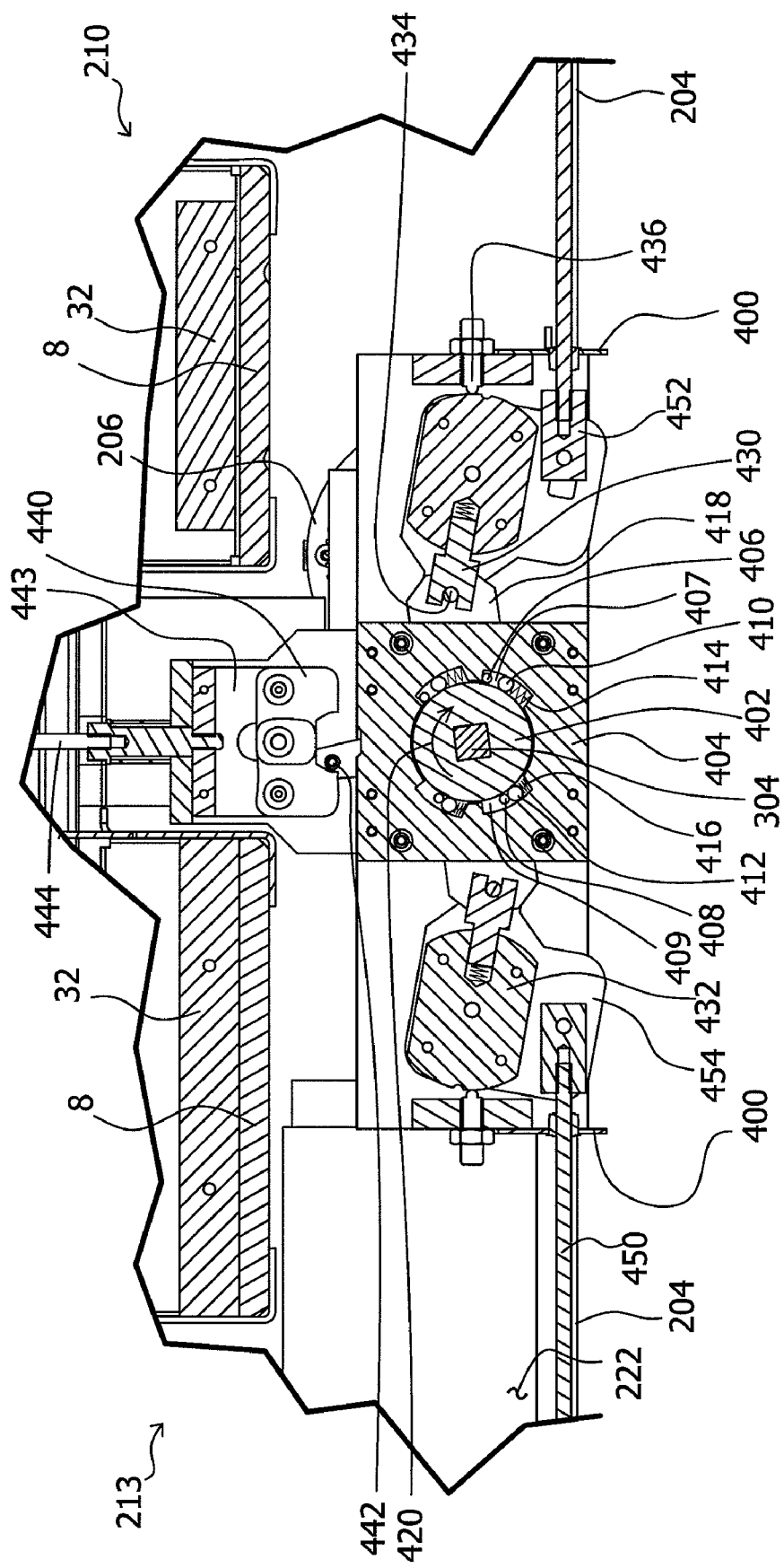
FIG. 15 is a partial view of the permanent magnet degausser of FIG. 11 along the cross sectional view III of FIG. 12.

In a first position illustrated in FIG. 15, the first pin 406 is disposed toward a narrow end of the first tapered cavity 407 and away from the first ball 410 and the first spring 414, thereby allowing the first ball 410 to rotate with minimal friction and allowing free rotation of the jam disk 402 and shaft 304 in a clockwise first direction indicated by the arrow 420. A reversal of torque against the direction of the arrow 420 will urge the first ball 410 toward the narrow end of the first tapered cavity 407 between the jam disk 402 and the housing member 404. The resulting friction of the jammed balls will effectively brake the jam disk 402, preventing counterclockwise rotation in the second direction.

At the same time, the second pin 408 is disposed away from a narrow end of the second tapered cavity 409 and toward the second ball 412 and the second spring 416 thereby pressing against the second ball 412 and compressing the second spring 416 into the wider portion of its cavity 409 to disable the locking action of that ball 412. Disposing the actuator arm 218 and pins 406 and 408 in a second position opposite to the first position allows rotation in the second direction opposite of the arrow 420.

Engaging forks 430 are spring-loaded in grooved members 432, such as detent blocks, and act on pivoting pins 434 pressed into the lateral ends of the actuator arm 418 to keep the pins 406 and 408 in either the first or second positions. In this preferred way, the grooved members 432 are operatively coupled to the actuator arm 418. Ball plungers 436 are disposed to slidably engage the grooved members 432 such that when the ball plungers 436 engage a groove of the grooved members 432, the actuator arm 418 is positioned in a neutral state wherein the first pin 406 and the second pin 408 are positioned in the first tapered cavity 407 and the second tapered cavity 409 to prohibit movement for the first ball 410 and the second ball 412 into the narrow end of the first tapered cavity 407 and the second tapered cavity 409, thereby disabling their jamming functions.

Self centering jaws 440 can act on an actuator arm pin 442 affixed to an upward end of the actuator arm 418 to force the detent blocks 432 into that neutral state. The jaws 440 self-center through the downward direction of the slotted plate's 443 acting on the lateral pivots of the jaws 440 to rotate them about their mutual fixed pivot. Guidance of the plate 442 and linkage to the rod 444 allow a user to disable the ball jamming action, for example, in the event of a media jam where reverse motion of the shuttle 212 is needed to clear the jam. A spring can return the disengagement device to its neutral position between functions. Lateral pivots of the jaws 440 can be made loose enough to accommodate the rigidity of the plate 443.

Rods 450 thread into engagement blocks 452, which act on engagement plates 454 that are rigidly attached to the detent blocks 432. Slots at a point of engagement between the detent blocks 452 and engagement plates 454 allow independent pushing action by either of the rods 450. In this preferred way, the rods 450 have a first end operatively engaged to the actuator arm 418.

Figure 16:
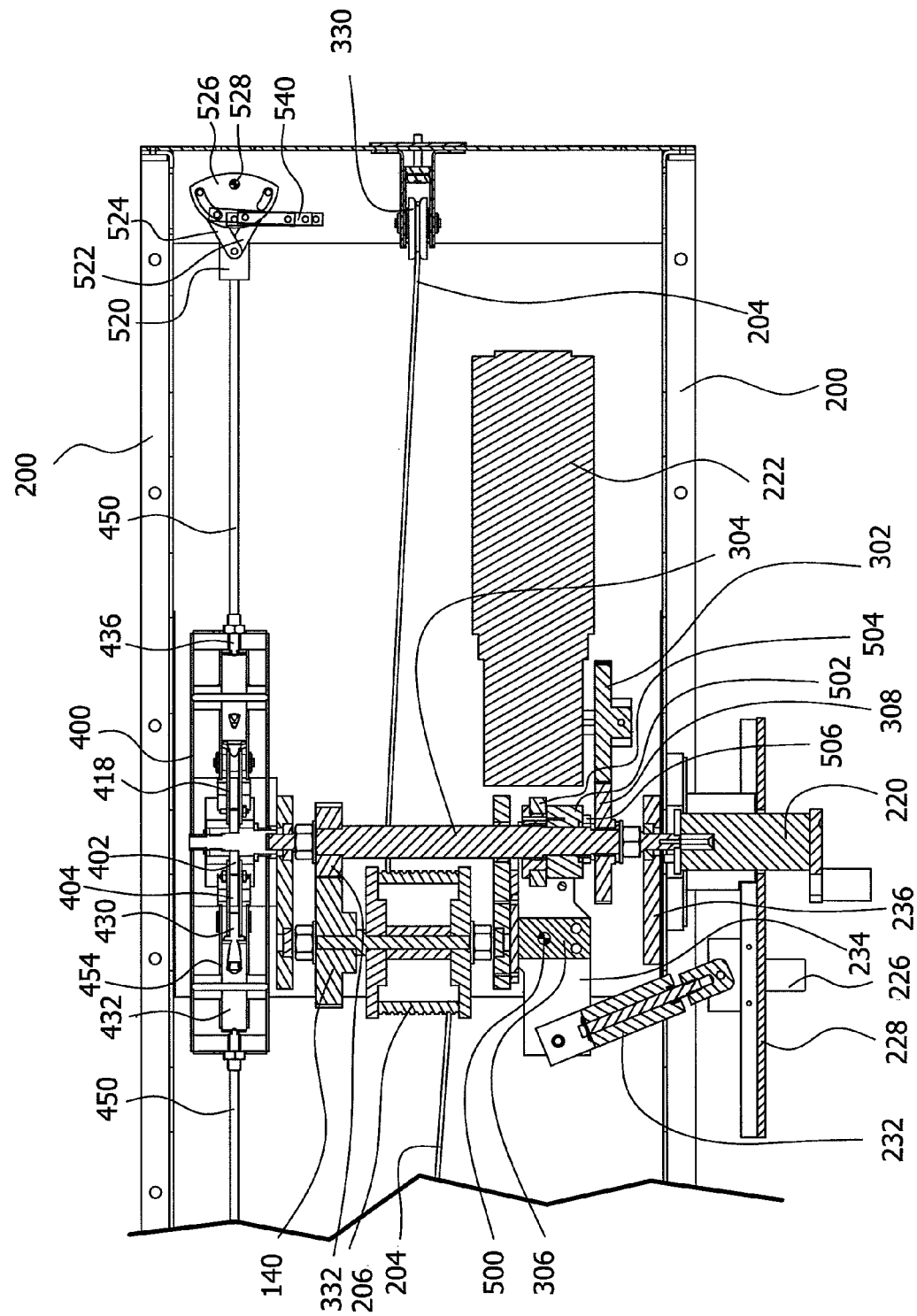
FIG. 16 is a partial view of the permanent magnet degausser of FIG. 11 along the cross sectional view IV of FIG. 12.
Figure 17:
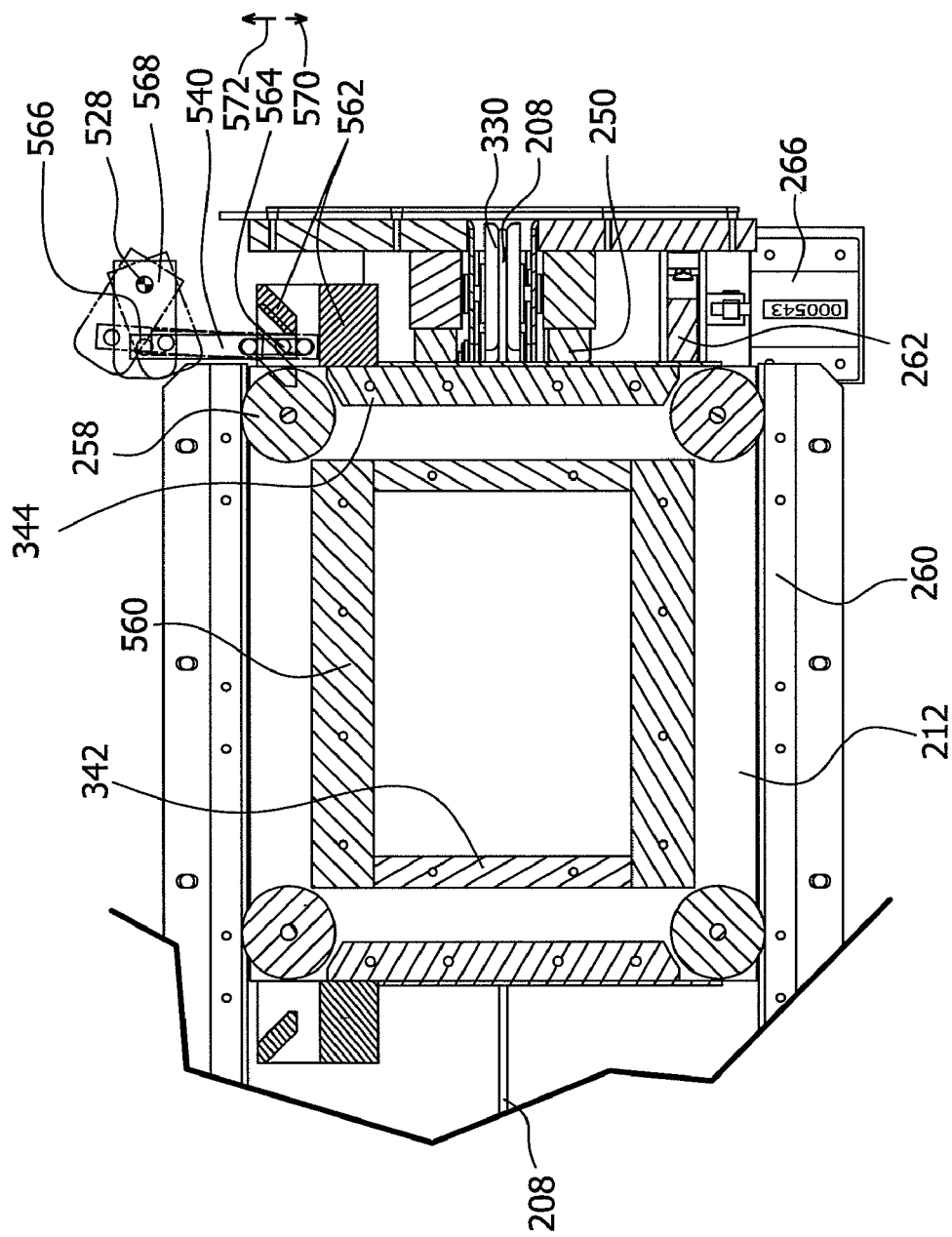
FIG. 17 is a partial view of the permanent magnet degausser of FIG. 11 along the cross sectional view V of FIG. 12.

With reference to FIGS. 16 and 17, a moving element such as the media transport shuttle 212 operatively engages linkages to push or pull the rods 450 into and out of the housing 400 with springs provided to help pull the rods 450 out of the housing 400. Such linkages can be predetermined to push the rod 450 to rotate the respective engagement plate 454 and pivoting block 432 to the neutral position. From the neutral state of the actuator arm 418, a greater push on the rod 450 enables the jamming action to suppress reversal except in the event of disengagement through the disengaging knob 282. The shuttle 212 includes side walls 560, and a mirror-imaged double sided cam 562 can be attached to each of the shuttle's 212 outer walls 344.

Preferably, a cam plate or disk 526 operatively engages a second end of the rod 450 and a lever arm or link 540 operatively engaged to the cam plate 526 such that, when the moving element or shuttle 212 operatively engages the lever arm 540, the cam plate 526 rotates thereby moving the rod 450 and the actuator arm 218. More particularly, as the shuttle 212 approaches a bumper 250, an inner face of the cam 562 can force a pin 564 pressed through the link 540 a short distance in direction 570, effecting relatively little counterclockwise rotation of the block 568 rigidly attached to turn about a point 528 fixed to the frame, allowing the shuttle 212 to be driven in an opposite direction. As the shuttle departs, the outer face of the cam 562 forces the pin 564 in a direction 572 opposite to and greater than the motion of the link 540 in direction 570, such that the shuttle 212 must travel to the opposite end where like events occur to disengage and reverse the process. The motion of the link 540 can be further controlled by its pin 564 riding along a linear slot fixed with respect to the frame, with its pin 566 pivotally attached to a block 568.

An end cap 520 attaches to the outer end of the rod 450, with two links 522 and 524 pivotally attached to the end cap 520. Rotation of the disk 526 in different directions about a pivot 528 fixed to the frame of the degausser 207 operatively engages the links 522 and 524. For example, relatively little counterclockwise rotation of the partial disk 526 can push a link 522 a relatively small distance, while pushing the rod 450 into the housing 400 just enough to disengage the bi-directional clutching mechanism. Conversely, relatively greater clockwise rotation of the partial disk 562 can push a link 524 a relatively greater distance, in turn pushing the rod 450 into the housing 400 enough to set the bi-directional clutching mechanism into a locking state opposite that prior to being disengaged by the push of the link 522.

The different length slots in the partial disk 526 preferably engage a pin such that the links 524 or 522 ride along the slots while the disk pushes the opposite link 533 or 524. Rotation of the partial disk 526 can realized through the link arm 540 operating on a member rigidly coupled to the disk 526.

The bidirectional latching one-way clutch mechanism ensures the passage of media through all the applied magnetic fields, thereby avoiding a reversal of direction after partial exposure. The bidirectional latching one-way clutch mechanism can be applied in any situation deserving complete reciprocating motion between some linear limits, or by modification of linkages, allowing rotary motion to reverse between some angular limits without allowing reverse rotary motion until the achievement of such limits.

A further advantage of the bidirectional latching one-way clutch mechanism includes the provision of timing for the shuttle 212. In other words, the one-way clutch mechanism is disengaged well after the shuttle 212 carries media through the magnetic fields. In some alternatives, the clutch mechanism may disengage just before a limit switch deactivates a motor driving the shuttle in that direction and before the shuttle actually hits the bumper, and clutch engagement against travel in the bumper direction will typically take place at greater distance from the bumper after the shuttle position has deactivated the limit switch.

With reference to FIG. 16, a clutch mechanism for selectively driving the shaft 304 with the crank 220 or the motor 222 is shown. The crank 220 is removeably attached to the shaft 304 through the hole in the sliding plate 228 to constrain the plate in position. Crank removal allows the plate 228 to slide by action on the knob 226, thereby placing the variable length link 232 under compression and encouraging the clutch arm 234 to rotate about the clutch pivot 500.

A clutch block 502 is rotatably mounted on a yoke 504 that is allowed to rotate slightly between the upper and lower plate members of the clutch arm 234. The yoke 504 has a hexagonal inner profile slidable along a mating hexagonal profile portion on the shaft 304. When sliding plate 228 shortens the distance between the end pivots of variable length link 232, the clutch plate 234 rotates bringing the yoke 504 and the clutch block 502 closer to the spur gear 302. If the dowel pins such as pin 506 attached to the clutch block 502 hit the spur gear 302, the variable length link 232 can compress. Motor 322 output rotation brings the dowel pins into alignment with holes in the spur gear to establish a solid path through the gears, pin, and clutch block to the hexagonal profile portion of shaft 304, thus driving the cable drum 206 and the shuttle 212.

The clutch arm 234 can be comprised of two plates situated above and below the variable length link 232, and the yoke 504 is allowed to rotate between them. Detents in the clutch arm 234 interact with bullet catches in the pivot block 306 to define the engaged and disengaged positions of the clutch. Such a clutch mechanism may be applied to the conveyor belt embodiment to allow for powerless, manual operation of the conveyor.

While this disclosure specifies orientations with respect to conveyance with the shortest media dimension or thickness axis vertical and media motion or direction of conveyance along the longest media direction, aspects of the invention can be applied to media oriented with the thickness axis horizontal with nearly equal practicality. Reorientation of the transport direction from horizontal to vertical and consequent reorientation of the media's longest dimension likewise of near equivalence to the preferred embodiments. Conveyance in the direction of the intermediate media dimension incurs a penalty in permanent material of less than direct proportion to the length/width aspect, given equal quantity of end material to counter fringing effects on magnetic strength.

Those skilled in the art will recognize that a wide variety of modifications, alterations, and combinations can be made with respect to the above described embodiments without departing from the spirit and scope of the invention. For example, many of the support structures for the conveyance means or magnetic field generators may be modified. Such modifications, alterations, and combinations are to be viewed as being within the ambit of the inventive concept.

We claim:

1. An apparatus for erasing magnetic storage media comprising:
    at least one magnetic field generator comprising magnetic elements arranged near a media conveyance path generating a plurality of magnetic field directions in the magnetic media conveyance path;
    a cleated conveyor belt defining magnetic storage media bins wherein the cleated conveyor belt moves substantially linearly through the magnetic media conveyance path; and a passive belt at least partially surrounding and movable around at least a portion of the at least one magnetic field generator.

2. The apparatus of claim 1 wherein the plurality of magnetic field directions further comprise magnetic field directions in at least a substantially horizontal field direction and at least a substantially vertical field direction with respect to the magnetic storage media.

3. The apparatus of claim 1 wherein the at least one magnetic field generator further comprises a plurality of permanent magnets wherein at least a first permanent magnet has an intrinsic coercivity higher that at least a second permanent magnet.

4. The apparatus of claim 3 wherein the first permanent magnet directs its field directly into the second permanent magnet.

5. The apparatus of claim 3 wherein the second permanent magnet has a higher remanence than the first permanent magnet.

6. The apparatus of claim 1 wherein the at least one magnetic field generator comprises a Halbach-like array.

7. The apparatus of claim 1 wherein the at least one magnetic field generator further comprises at least two magnetic assemblages disposed on opposite sides of the magnetic media conveyance path.

8. The apparatus of claim 7 wherein the at least one magnetic field generator further comprises at least two plates extending between the at least two magnetic assemblages to surround the magnetic media conveyance path.

9. The apparatus of claim 7 wherein the at least one magnetic field generator further comprises at least two side magnetic assemblages extending between the at least two magnetic assemblages to surround the magnetic media conveyance path.

10. The apparatus of claim 1 wherein the cleated conveyor belt engages a plurality of rotatable drums.

11. The apparatus of claim 10 wherein the rotatable drums are crowned.

12. The apparatus of claim 1 wherein the passive belt passes over a plurality of freely rotatable pulleys disposed around at least a portion of the at least one magnetic field generator such that the passive belt moves in a direction substantially similar to the direction of the cleated conveyor belt.

13. The apparatus of claim 1 further comprising:
    a motor operatively coupled to drive the cleated conveyor belt;
    a control mechanism operatively connected to the motor;
    at least one sensor disposed in a spaced relationship with the cleated conveyor belt and operatively connected to the control mechanism such that when an object contacts the cleated conveyor belt and another portion of the apparatus operatively connected to the at least one sensor the control mechanism stops operation of the motor.

14. The apparatus of claim 1 further comprising:
    a motor operatively coupled to drive the cleated conveyor belt;
    a control mechanism operatively connected to the motor;
    at least one sensor disposed in a spaced relationship with the cleated conveyor belt and operatively connected to the control mechanism such that when an object contacts the cleated conveyor belt and another portion of the apparatus operatively connected to the at least one sensor the control mechanism stops operation of the motor and enables reverse operation of the motor.

15. A method of erasing magnetic storage media comprising:

providing at least one magnetic field generator generating a plurality of magnetic field directions in a magnetic media conveyance path;

moving a cleated conveyor belt defining magnetic storage media bins substantially linearly through the magnetic media conveyance path;

providing a passive belt at least partially surrounding and movable around at least a portion of the at least one magnetic field generator;

wherein magnetic storage media placed in the magnetic storage media bins are erased.

* * * * *